United States Patent
Kuwada et al.

[11] Patent Number: 5,274,410
[45] Date of Patent: Dec. 28, 1993

[54] CAMERA HAVING A LENS BARRIER WHICH IS OPENED ONLY DURING PHOTOGRAPHING

[75] Inventors: Atsushi Kuwada; Hiroshi Kiten; Takeo Hoda; Toshio Yamaki; Dai Shintani; Yoshihiro Tanaka; Yoshito Tanaka, all of Osaka, Japan

[73] Assignee: Minolta Camera Kabushiki Kaisha, Osaka, Japan

[21] Appl. No.: 779,141

[22] Filed: Oct. 21, 1991

Related U.S. Application Data

[63] Continuation of Ser. No. 479,869, Feb. 14, 1990, abandoned.

[30] Foreign Application Priority Data

| Feb. 15, 1989 | [JP] | Japan | 1-16451[U] |
| Feb. 16, 1989 | [JP] | Japan | 1-37176 |
| Mar. 7, 1989 | [JP] | Japan | 1-54479 |
| Mar. 7, 1989 | [JP] | Japan | 1-54480 |
| Mar. 8, 1989 | [JP] | Japan | 1-26846[U] |
| Mar. 24, 1989 | [JP] | Japan | 1-73139 |
| May 18, 1989 | [JP] | Japan | 1-125294 |

[51] Int. Cl.$^5$ .............. G03B 9/08; H04N 5/225; H04N 5/78
[52] U.S. Cl. .............. 354/226; 354/266; 358/906; 358/909; 360/35.1
[58] Field of Search .............. 354/226, 227.1, 456, 354/288, 250, 245, 241, 448, 266, 204; 358/906, 909, 22.7; 360/35.1

[56] References Cited
U.S. PATENT DOCUMENTS

4,057,830 11/1977 Adcock .............. 358/127

OTHER PUBLICATIONS

"Camera Test of Canon Autoboy Tele 6 Date", of Photographic Industries, vol. 46, No. 469, pp. 74-79, published May, 1988, by Shashinkogyo Shuppansha.
Article entitled "Konica KC-300", of Photographic Industries, vol. 47, No. 478, published Feb. 1, 1989, by Shashinkogyo Shuppansha, pp. 38, 39 and 48-52.

Primary Examiner—Michael L. Gellner
Assistant Examiner—Cassandra Spyrou
Attorney, Agent, or Firm—Willian Brinks Olds Hofer Gilson & Lione

[57] ABSTRACT

An imaging apparatus of an electronic camera according to the present invention has a lens barrier arranged on an object side of a photographing lens; an imaging device capable of changing electric charge storage time; a lens barrier state-detecting means for outputting a signal indicating an opening state of the lens barrier after detecting the opening state of the lens barrier; a release switch for starting a photographing operation; an imaging device control means for starting electric charge storage of the device when the signal of the opening state of the lens barrier is outputted from the detecting means and for outputting a charge termination signal when the charge is terminated; and a lens barrier opening and closing driving means for driving the lens barrier to open on the basis of a turning-on signal of the release switch and for driving the lens barrier to close on the basis of the charge termination signal outputted from the control means. In this apparatus, by driving the driving means, the lens barrier is opened only during a photographing period, while the lens barrier is closed during a non-photographing period to prevent the device from being exposed to strong outside light.

11 Claims, 28 Drawing Sheets

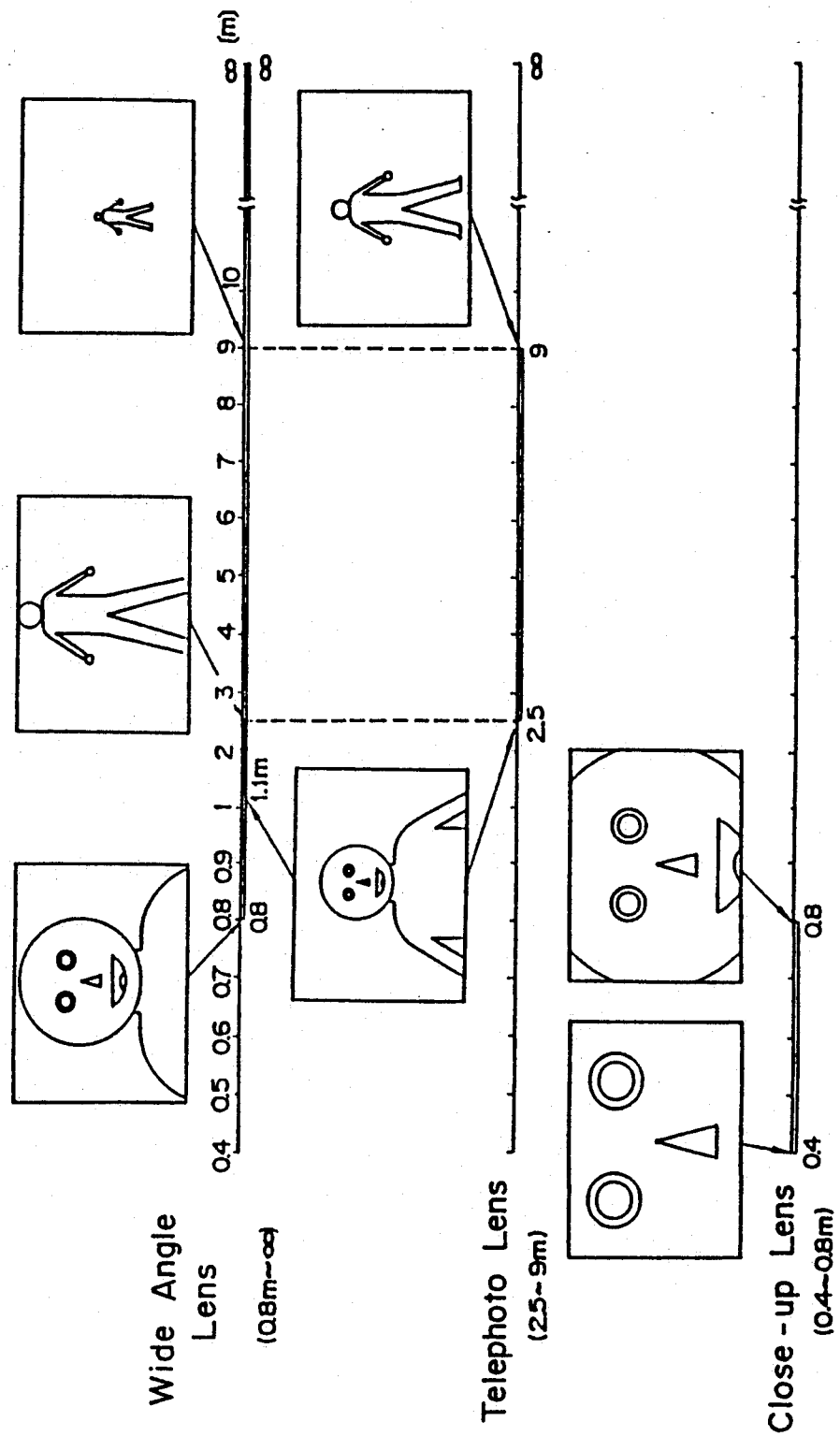

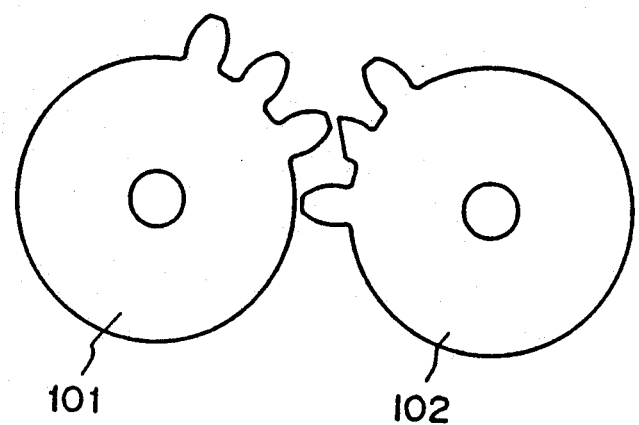
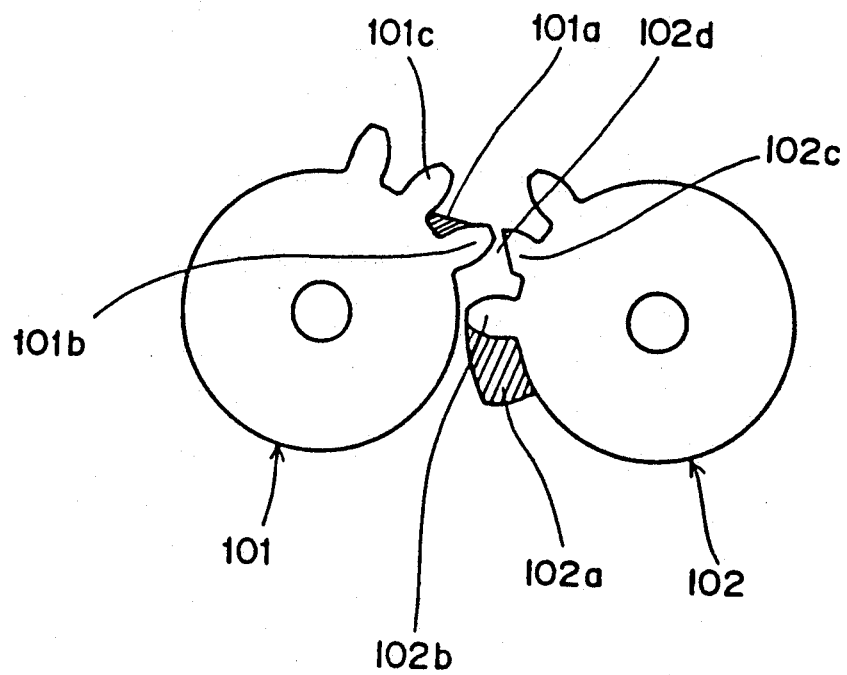

CAMERA HAVING A LENS BARRIER WHICH IS OPENED ONLY DURING PHOTOGRAPHING

This application is a continuation of U.S. patent application Ser. No. 07/479,869, filed Feb. 14, 1990 now abandoned.

BACKGROUND OF THE INVENTION

The present invention relates to an electronic camera in which a lens barrier can be opened only in exposure, and more specifically, to an imaging apparatus of an electronic camera having a CCD shutter which is actuated to open by an opening signal of the lens barrier and to close the lens barrier by an electric charge storage termination signal from the CCD.

Additionally, the present invention relates to a multi-focus camera having photographing lens systems with at least two different focal lengths; one of the photographing lens systems being a standard lens and the other being a photographing lens system different from a standard lens system, the photographing lens system being capable of being used only when an operating member corresponding to the system is operated.

Moreover, the present invention relates to a magnification change mechanism of a camera having at least two photographing lenses with different focal length or object distance, the mechanism changing over a rotary direction of a motor in only one rotary direction thereof.

Conventionally, there are proposed imaging apparatus of electronic cameras having various construction which has a CCD serving as an imaging device. For example, there is proposed a CCD having a CCD shutter function accomplished in a camera to perform correct exposure by changing electric charge storage time of the CCD without a light quantity adjusting means such as a diaphragm or a shutter blade.

According to the construction, however, a member for preventing the CCD from being exposed to strong outside light is not arranged therein, and thus it is dangerously possible to burn the CCD by the strong outside light even if the camera does not have a diaphragm or a shutter blade.

Additionally, there are conventionally proposed above-mentioned types of multi-focus cameras having various construction. For example, there is proposed a camera having photographing lens systems with two different focal lengths, in which one of the systems is a standard lens and the other is a Telephoto lens for magnifying a far object or a Close-up lens for simply enjoying a close-up. In such a camera, when a photographer switches a change-over switch from an off-position to a Telephoto operating-position or a Close-up operating-position, the photographer can photograph performing the desired function. After photographing with the desired function, the photographer returns the switch from the operating-position to the off-position to be capable of photographing with the standard lens system.

According to the construction, however, after the photographer switches the switch therefrom to the Telephoto operating-position or the Close-up operating-position, if the photographer forgets to return the switch to the off-position, the switch can not return to the off-position automatically and the photographing lens system remains in different from the standard lens system. As a result, such a problem is encountered that even though the photographer wants to photograph using the standard lens system, the Telephoto function or the Close-up function is erroneously performed during a photographing period.

Moreover, there have been known magnification change mechanisms of cameras having various construction. For example, FIG. 13 shows a schematic view of a change-over mechanism for use in a magnification change mechanism as one example. In FIG. 13, the lens change-over movement is a lens reciprocating motion for moving between a photographing position where a lens is located on a photographing optical path and a retracting position where the lens is retracted from the path, and the operation is performed by the use of the normal and reverse rotations of a motor (M).

According to the construction, however, since the motor (M) always engages with the lenses through gears, it is necessary to rotate the motor (M) in both directions, the normal and reverse directions. Therefore, in order to rotate the motor (M) in the normal and reverse directions, it is necessary to arrange at least four switching means (normally transistors) (S) between a DC power (E) and the motor (M) and at least two output ports of a microcomputer in the camera for operating the switch means (S), with the result that it has some drawback that a control circuit is complex and expensive.

On the other hand, there is, as shown in FIG. 14, a method for changing over lenses by the normal rotation of a motor (M) conventionally (Japanese Laid-open Patent Publication No. 60-45214). That is, in this method, a lens barrel (D) has plural lenses (F) and (G) and is connected to the motor (M) through a reduction gear mechanism (H), whereby the barrel (D) rotates by the normal rotation of the motor (M) through the reduction gear mechanism (H) to change over between the lenses (F) and (G).

In this method, however, since each lens rotates 360 degrees with the barrel (D) for the change-over of the lenses, such a problem is encountered that it is necessary to define a large space for permitting rotation of the lenses together with the barrel (D) in a camera, resulting in large size.

SUMMARY OF THE INVENTION

Accordingly, an essential object of the present invention is to resolve the above-described problems and to provide an imaging apparatus of an electronic camera capable of effectively preventing an imaging device from being burned. The apparatus is so constructed that a lens barrier is opened during a photographing period and closed to prevent the device from being exposed to strong outside light during a non-photographing period. That is, the apparatus comprises: the lens barrier arranged on an object side of a photographing lens; an imaging device capable of changing electric charge storage time; a lens barrier state-detecting means for outputting a signal indicating an opening state of the lens barrier after detecting the opening state of the lens barrier; a release switch for starting a photographing operation; an imaging device control means for starting electric charge storage of the device when the signal of the opening state of the lens barrier is outputted from the detecting means and for outputting a charge termination signal when the charge is terminated; and a lens barrier opening and closing driving means for driving the lens barrier to open on the basis of a turning-on signal of the release switch and for driving the lens barrier to close on the basis of the charge termination signal outputted from the control means.

According to the construction, the lens barrier is arranged on the object side of the photographing lens and the turning-on signal of the release switch causes the lens barrier opening and closing driving means to be driven to open the lens barrier before photographing. After the signal indicating the opening state of the lens barrier is outputted from the lens barrier state-detecting means, the electric charge storage starts in the imaging device. After termination of the charge storage, the charge termination signal is outputted from the control means to drive the driving means to close the lens barrier. Therefore, since the lens barrier is opened only during a photographing period and closed during a non-photographing period, the lens barrier covers the photographing lens and the device to prevent the device from being exposed to strong outside light even if a camera body does not have a diaphragm and a shutter blade. Then, it is effectively possible to prevent the outside light from burning the device. Since the lens barrier also covers the photographing lens during a non-photographing period, the lens can be protected.

Another important object of the present invention is to resolve the above-described problems and to provide a multi-focus camera capable of effectively preventing a photographer from photographing against intention of the photographer. The camera is so constructed that in a case where the photographer wants to photograph using a special function such as the Telephoto or Close-up function, only when the photographer intentionally operates an operating member and then the operating member is operated, the photographing with the special function can be performed. That is, the camera comprises: at least two photographing lens systems, at least one of the systems being a standard lens system, the other of the systems being a photographing lens system different from the standard lens system, the two photographing lens systems selectively being changed over to photograph; an operating member for changing over from the standard lens system to the photographing lens system different from the standard lens system; a lens change-over driving mechanism for changing over from the standard lens system to the photographing lens system different from the standard lens system by operating the member during a non-photographing period and for changing over from the photographing lens system different from the standard lens system to the standard lens system after the member is operated.

According to the construction, only when the operating member is operated during a non-photographing period, the photographing lens system can change over therefrom to the photographing lens system different from the standard lens system by the lens change-over driving mechanism, and after the operation of the operating member finishes, the photographing lens can change over from the photographing lens system different from the standard lens system to the standard lens system by the lens change-over driving mechanism. Therefore, the photographing with the lens system different from the standard lens system can be performed only in a case where a photographer intentionally operates the operating member, while the photographing with only the standard lens system can be performed in a case where the operating member is not operated. Thus, the photography can be effectively prevented from erroneously photographing against his or her intention.

A further object of the present invention is to resolve the above-described problems and to provide a magnification change mechanism of a camera in which a control circuit of a motor is not complex, the camera being cheaper and small-sized. The mechanism is so constructed that the mechanism has at least two driven rotary members with respect to a driving rotary member connected to a motor, at least one of the driven rotary members, directly and indirectly through one of the remaining of the driven rotary members, being connected to the driving rotary member, thereby one of the driven rotary members rotates in the normal and reverse directions by rotation of the motor in one direction. That is, the mechanism according to one preferred mode of the present invention comprises: the driving rotary member connected to the motor, a first driven rotary member, and a second driven rotary member; only at a first section of a rotary angle of the driving rotary member, driving force being capable of being transferred between the driving rotary member and the first driven rotary member; only at a second section of the rotary angle of the driving rotary member which is different from the first section, driving force being capable of being transferred between the driving rotary member and the second driven rotary member; driving force always being capable of being transferred between the first and second driven rotary members.

Moreover, a magnification change mechanism of a camera according to another mode of the present invention comprises: the driving rotary member, a first driven rotary member, and a second driven rotary member; driving force always being capable of being transferred between the driving rotary member and the first driven rotary member; only at a specified section of a rotary angle of the driving rotary member, driving force being capable of being transferred between the driving rotary member and the second driven rotary member; only at another section of the rotary angle of the driving rotary member which is different from the specified section, driving force being capable of being transferred between the first and second driven rotary members.

According to the construction, the driven rotary member is, directly and indirectly through the another driven rotary member, connected to the driving rotary member connected to the motor, thereby the driven rotary member can rotate in the normal and reverse directions thereof by rotation of the motor in one direction. Therefore, it is unnecessary to rotate a motor in normal and reverse directions and then to arrange four switching means and two output ports of a microcomputer for operating the switching means, with the result that the control circuit of the motor is not complex and is cheaper. Since a lens is inserted into and retracted from the photographing optical path by the normal and reverse directions of the driven rotary member, it is unnecessary to rotate a lens supporting-member such as a lens barrel 360 degrees, resulting in providing a small-sized camera.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a view showing a photographable distance of each lens and an image plane ratio during a photographing period of a person by each lens;

FIG. 7(a) and 7(b) are a front view of a partially toothed gear and a front view of the gear in a case where the gear has a deposit portion, respectively;

DETAILED DESCRIPTION OF THE EMBODIMENTS

Figure 1A:
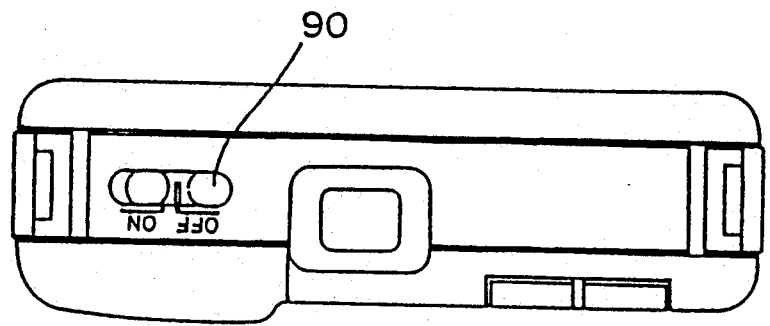
FIGS. 1(*a*), 1(*b*), 1(*c*), 1(*d*) and 1(*e*) are respectively a plan view, a front view, a bottom view, a left side view, and a right side view showing an electronic still camera having a camera magnification change mechanism according to one preferred embodiment of the present invention.
FIG. 1(f) is an explanatory view of a driving system arranged in the camera.

Before the description of the present invention proceeds, it is to be noted that like parts are designated by like reference numerals throughout the accompanying drawings.

Hereinafter, one embodiment according to the present invention will be described in detail referring to FIGS. 1-11. An electronic still camera functioning as an imaging apparatus for an electronic camera according to the embodiment will be described.

Figure 1B:
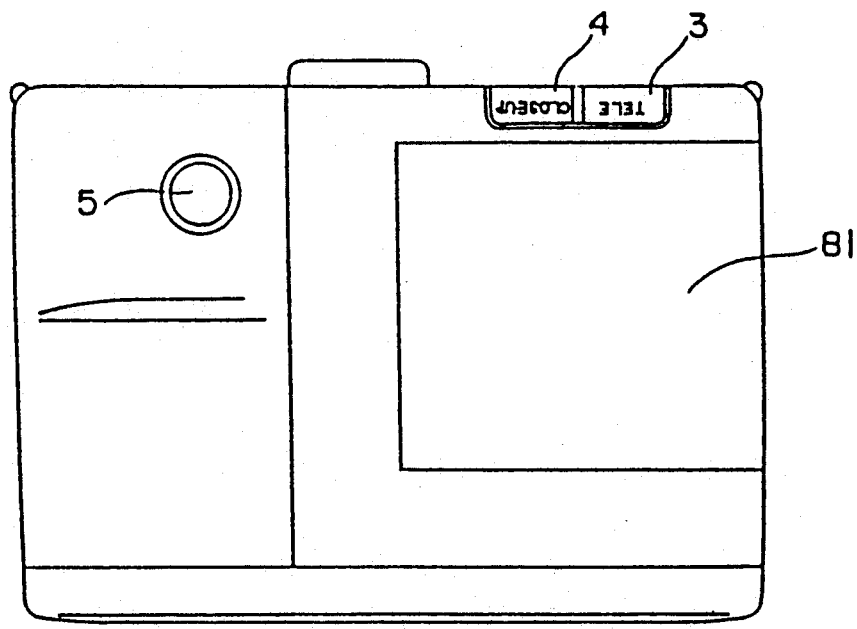
Figure 1C:
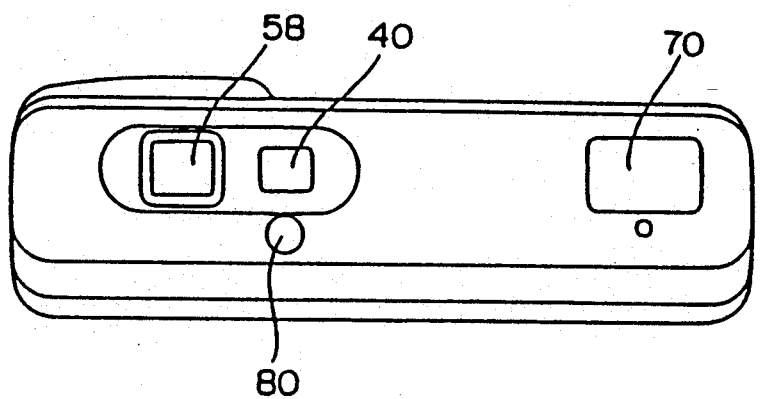
Figure 1D:
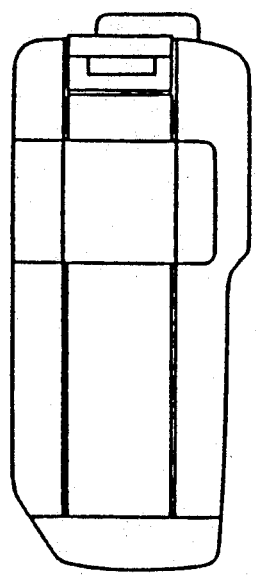
Figure 1E:
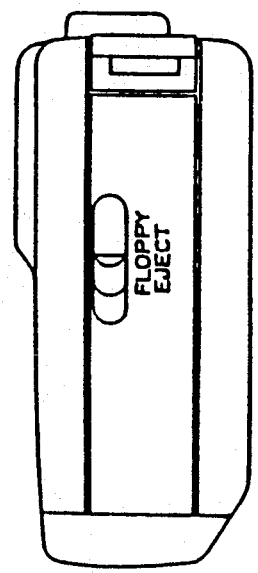

FIGS. 1(a)-1(e) show sketch views of an electronic still camera according to the one embodiment of the present invention. As shown in FIG. 1(c), at the front surface of the camera, an electronic flash 70, a light measuring unit 80, a viewfinder 40, and a lens aperture in which a lens barrier 58 appears in a normal position are arranged. As shown in FIG. 1(b), at the upper surface of the camera, a release switch 5, a Telephoto lens switch 3, and a Close-up lens switch 4, which are for changing over lenses, are arranged. As shown in FIG. 1(a), at the rear surface of the camera, a main switch 90 for turning-on and off an electric source is arranged. In the camera, an imaging device 25 is arranged behind the barrier 58 through a photographing lens system and an image photographed by the device 25 is image-processed and then recorded on a floppy disk set in the camera through a desk 81.

Figure 1F:
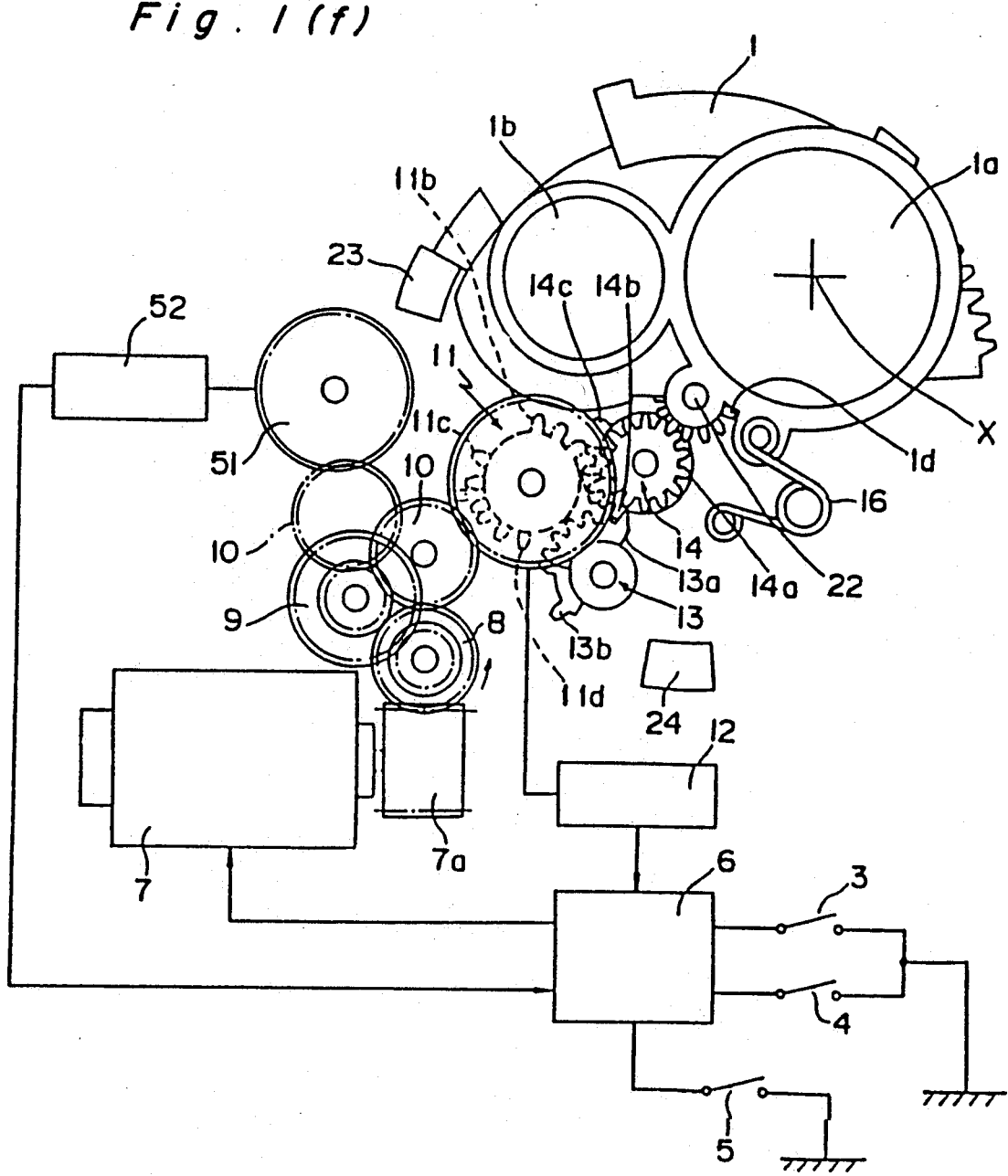

FIG. 1(f) shows a system of the camera of the embodiment. In FIG. 1(f), a lens barrier driving-unit and a lens rear block 2 each described later are omitted for simplification. A photographing lens system in the embodiment has a lens front block 1 holding two primary optical systems (A) 1a and (B) 1b and the lens rear block 2 holding a secondary optical system (C) 2c which is inserted into and retracted from a position near the device 25 with respect to the primary optical system (B) 1b when the primary optical system (B) 1b is positioned on a photographing optical path (X denotes a center of the path). These two blocks 1 and 2 are rotatably supported by a lens rotary shaft 22 within 90 degrees of the rotary angle thereof and are fixed under pressure by snap springs 16 and 17 to positions which angles are 0 degree or 90 degrees.

TABLE 1

|  | lens front block | lens rear block | viewfinder secondary optical system |
|---|---|---|---|
| Wide angle | A |  | Wide angle converter |
| Telephoto | B |  |  |
| Close-up | B | C | wedge-shaped lens |

Figure 2A:
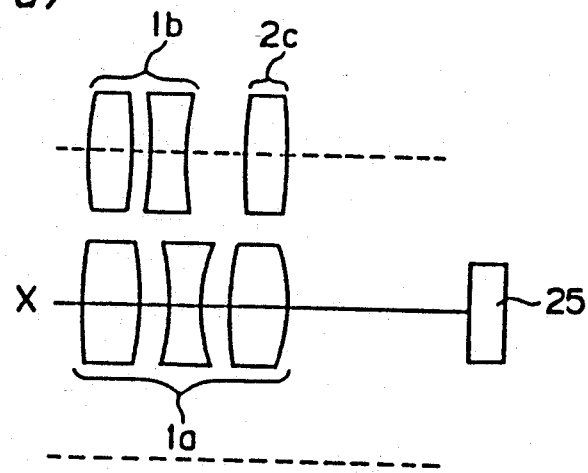
FIG. 2(a), 2b and 2(c) are respectively explanatory views showing a Wide angle lens state, a Telephoto lens state, and a Close-up lens state.
Figure 2B:
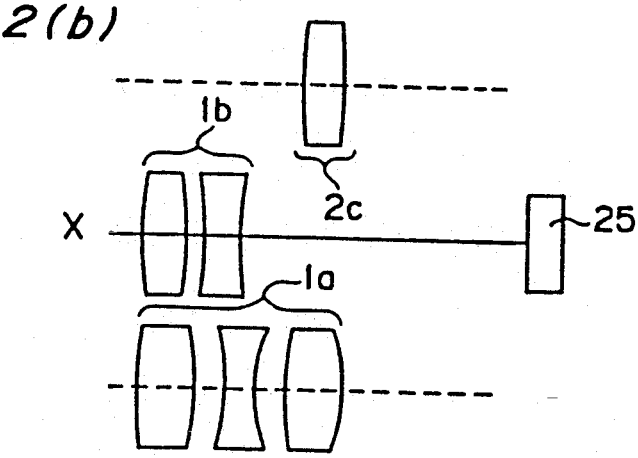
Figure 2C:
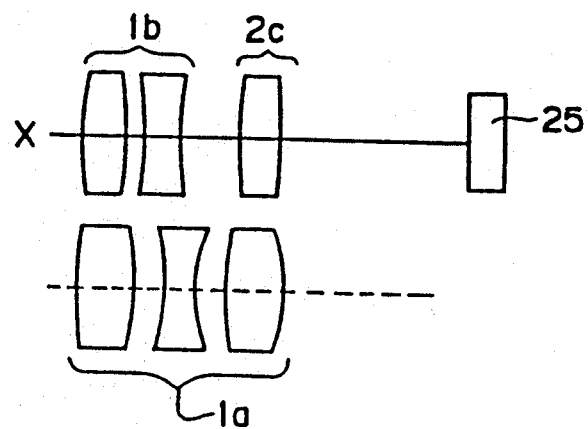

As shown in Table 1, the photographing optical system of the embodiment is used as three different photographing lenses according to positions of the lens front block 1 and the lens rear block 2. FIG. 2 shows a schematic view showing each state of the photographing optical systems. FIG. 2(a) shows a Wide angle lens state, FIG. 2(b) shows a Telephoto lens state, and FIG. 2(c) shows a Close-up lens state.

In this embodiment, each photographing lens in the three states has fixed focus, a Wide angle lens is f9/F3.5, and a Close-up lens is f20/F16. A large F-number of the Close-up lens causes the depth of field to be thicker. Thus, since photographable distance (distance capable of focusing) is smaller in the Close-up lens, the electronic flash is emitted for photographing under the low ambient light. FIG. 3 shows the photographable distance of each lens and magnification images in cases where a person is photographed by each lens at a certain distance.

In the embodiment, a standard state of the photographing lens is the Wide angle lens state, and then the Telephoto switch 3 and the Close-up switch 4 are arranged as two operating members for change magnification. On operating these switches 3 and 4 continuously, the photographing lens is switched from the Wide angle lens state to the Telephoto lens state or the Close-up lens state, while on stopping operating the operating members 3 and 4, the lens is switched to return to the Wide angle lens state again.

When the release switch 5 is turned on to photograph while either the Telephoto lens or the Close-up lens is selected, the photographing lens is automatically switched to return to the Wide angle lens state after exposure.

The lens barrier 58 described later (referring to FIG. 6) is opened on turning-on the release switch 5 and closed after exposure in order to prevent the imaging device 25 from being burned. In the embodiment, the device 25 can control start and termination of the charge storage and change the charging time to adjust correct exposure without means for adjusting quantity of light such as a diaphragm, with the result that the apparatus is not provided with a diaphragm. As a result, the barrier 58 is opened only in exposing because if the barrier 58 is always opened, strong outside light enters the apparatus to burn the device 25.

Figure 11A:
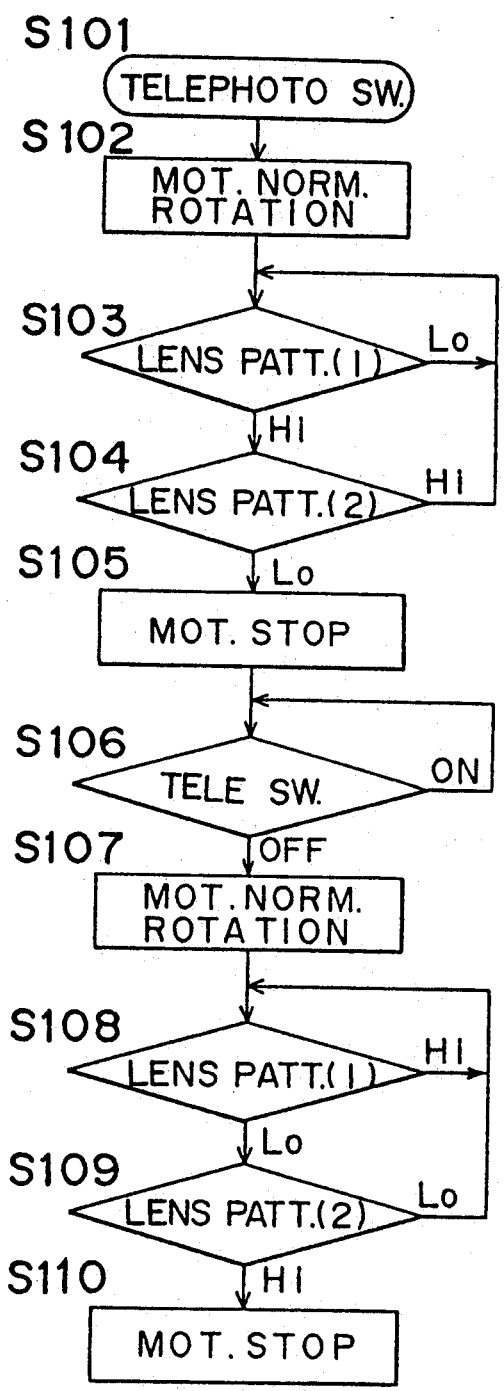
FIGS. 11(a) and 11(b) are flow charts of the lens change-over operation.
Figure 11B:
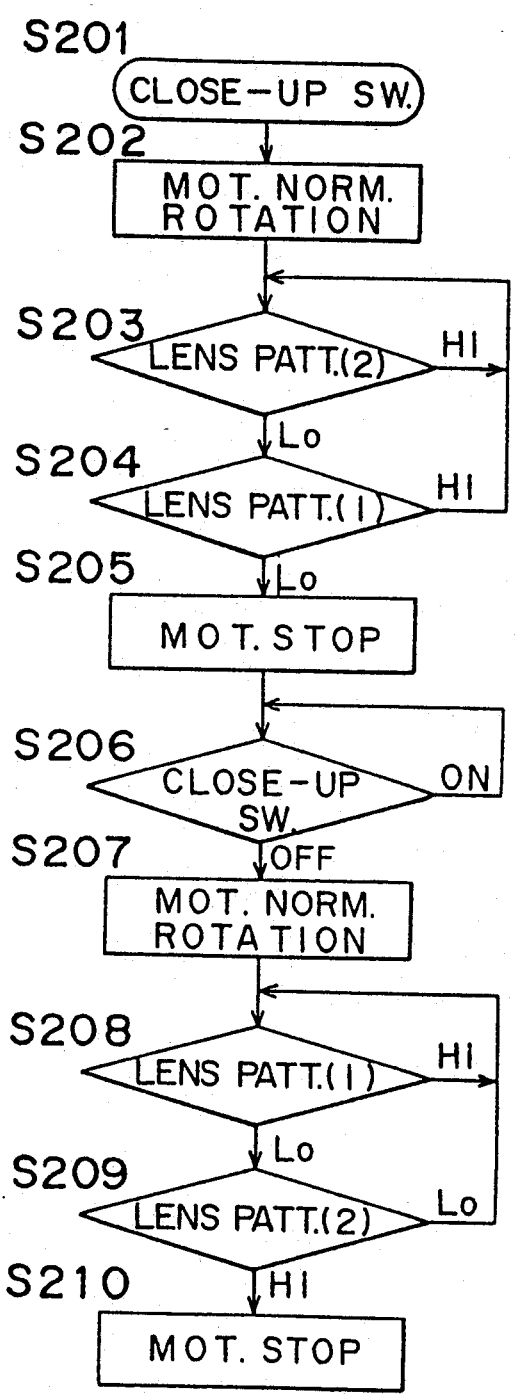

Next, the change-over operation from the Wide angle lens state to the Telephoto lens state will be explained hereinafter referring to FIGS. 1(f) and 4. The step number in the following description corresponds with the step number in the flow chart of FIG. 11. As shown in FIG. 11(a), when a photographer turns on the Telephoto switch 3 at step S101, at step S102, a motor 7 rotates in a normal direction on the basis of the control of a microcomputer 6 arranged in a camera. A worm gear 7a is attached to a driving shaft of the motor 7 in the embodiment. Then, here, the normal direction of the motor 7 expresses a direction in which a reduction gear 8 comprising of a worm wheel rotates and which is shown by an arrow in the figure and a reverse direction thereof expresses the opposite direction. A normal direction in a gear train and rotary members different from the motor 7 expresses the clockwise direction thereof and a reverse direction thereof expresses the counterclockwise direction. When at S102, the motor 7 rotates in the normal direction, a sun gear 9 rotates in the normal direction through the reduction gear 8. The sun gear 9 rotates in the normal direction, thus planetary gears 10 engage with an input gear 11a of a lens change-over gear (A) 11, i.e. a quartet gear, to transfer the rotary force to lens change-over gear (A) 11, resulting in causing normal rotation of the gear (A) 11. A lens state-detecting means 12 is arranged at the lens change-over gear (A) 11, so that signals indicating the three states are outputted from the detecting means 12 during one rotation of the lens change-over gear (A) 11.

Figure 5A:
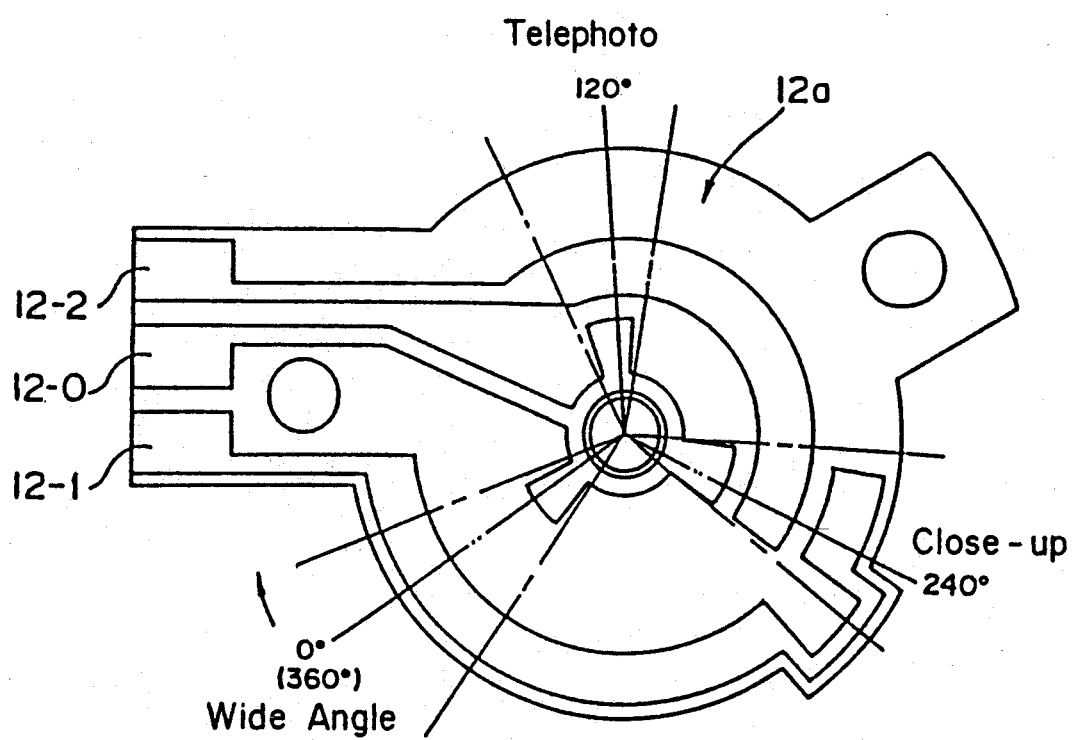
FIG. 5(a) is a view showing a conductive pattern of a pattern base plate of a lens state-detecting means.
Figure 5B:
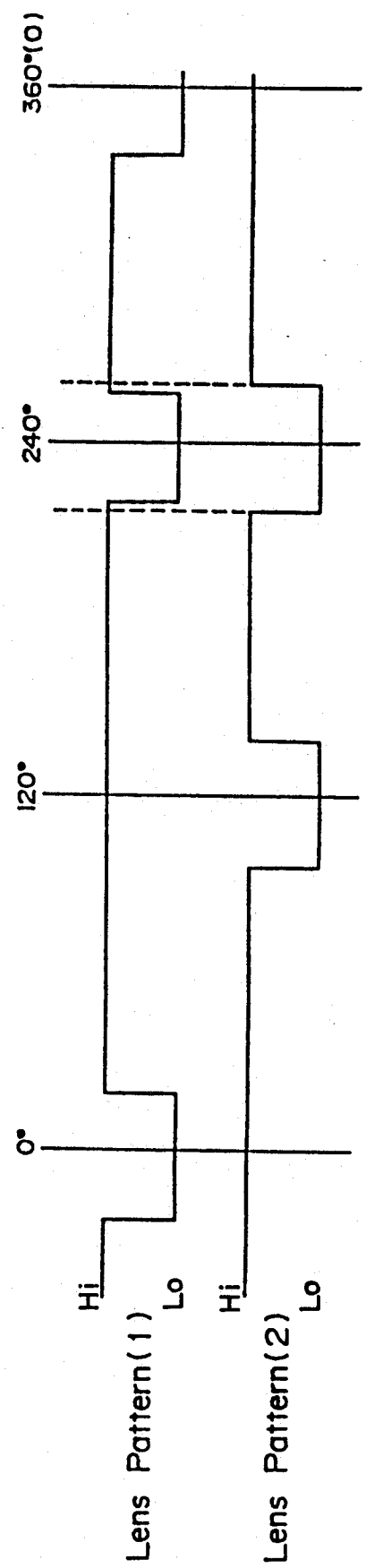
FIG. 5(b) is a timing chart showing signals generated from the base plate and contacts.

FIG. 5(a) shows a view showing a conductive pattern of a pattern base plate 12a which is an element in the detecting means 12 according to the embodiment. The detecting means 12 is so functioned that contacts 12b fixed to the lens change-over gear (A) 11 slide on the base plate 12a to connect a conductive pattern (1) 12-1 and a conductive pattern (2) 12-2 with a ground line 12-0 in order to output a signal. FIG. 5(b) shows a timing chart of which the abscissa indicates rotary angles of the detecting means 12, in which a low level of a signal indicates a case where the patterns (1) 12-1 and (2) 12-2 are connected with the ground line 12-0 and a high level of the signal indicates a case where the patterns (1) 12-1 and (2) 12-2 are not connected with the ground line 12-0. Table 2 shows relation between each lens pattern and each potential of each lens state.

TABLE 2

|  | Wide angle lens | Telephoto lens | Close-up lens | during change-over operation |
|---|---|---|---|---|
| lens pattern (1) | Low | High | Low | High |
| lens pattern (2) | High | Low | Low | High |

As it is clear from FIG. 5(b), signals indicating the Wide angle lens state, the Telephoto lens state, and the Close-up lens state are outputted every approximately 120 degrees (corresponding to a region which is divided one circle into three equal parts). Regions for outputting the signals are narrower than regions where each lens is in each state and thus when the signal is outputted, the photographing lens is certainly in the state corresponding to the outputted signal.

In the Close-up lens state, as shown in FIG. 5(b), the region where the signal is rendered to be low in the lens pattern (2) 12-2 is wider than the region of the low level signal in the lens pattern (1) 12-1. The reason relates with the operation returning from any state to the Wide angle lens state in the lens change-over operation described later and is previously briefly described herein. If the regions in the lens patterns (1) 12-1 and (2) 12-2 are the same as each other, because of relative positioning errors between the lens pattern base plate 12a and the contacts 12b and errors of the patterns of the pattern base plate 12a and contacts 12b, it is possible that the signal indicating the Wide angle lens state, that is, the lens pattern (1) 12-1 is rendered to be low and the lens pattern (2) 12-2 is rendered to be high, is outputted, resulting in causing an error operation. Then, the region for outputting the Telephoto lens state signal by which such an error operation is not caused is arranged at the both adjacent sides of the region for outputting the signal of the Close-up lens state.

The reason why each pattern for outputting each state signal has predetermined excessive areas at the both sides thereof is that there is variation in time of period from outputting from the detecting means 12 to stopping the motor 7 and that the same state signal is outputted from the detecting means 12 in stopping the motor 7.

Figure 4A:
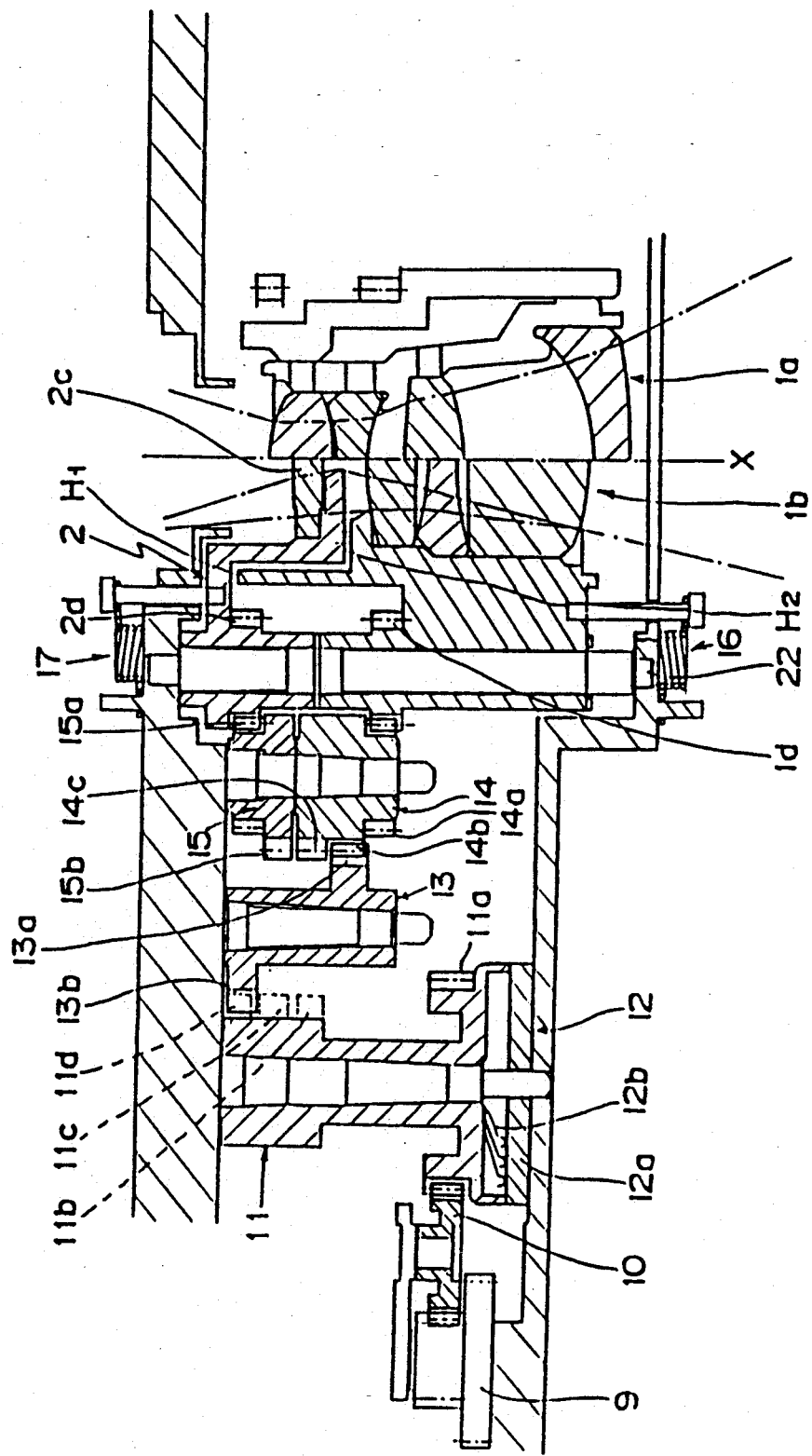
FIG. 4(a) is a sectional view showing an essential part of a lens change-over driving mechanism.

Hereinafter, the lens change-over operation will be explained referring to FIG. 4. FIGS. 4(b), 4(d), 4(f), 4(h), 4(j), and 4(l) show the operation of the lens front block 1. FIGS. 4(c), 4(e), 4(g), 4(i), 4(k), and 4(m) show the operation of the lens rear block 2. Based on the above normal rotation of the motor 7, the lens change-over gear (A) 11 rotates in the normal direction. Then, when the Telephoto signal is inputted from the detecting means 12 into the microcomputer 6 at S103 and S104, the motor 7 stops rotating by the microcomputer 6 at S105. At this time, the contacts 12b stop on the lens pattern base plate 12a at the region of approximately 120 degrees to indicate the Telephoto lens state. The lens change-over gear (A) 11 and a lens change-over gear (C) 14 are partially toothed gears together. In the Wide angle lens state shown in FIGS. 4(b) and 4(c), the gears are not brought into engagement with each other, but after starting rotation of the lens change-over gear (A) 11, a gear portion 11b of the lens change-over gear (A) 11 brings into engagement with a gear portion 14c of the lens change-over gear (C) 14 to start to bring the gear (A) 11 into engagement with the gear (C) 14 shown in FIGS. 4(d) and 4(e)., the gear portions 11b and 14c are disengaged from each other before stopping the motor 7. Here, as shown in FIG. 4(a), the first output gear portion 11b of the lens change-over gear (A) 11 which is a quartet gear transfers the rotary force from the lens change-over gear (A) 11 to the lens change-over gear (C) 14. By rotation of the lens change-over gear (C) 14, a first gear portion 14a of the gear (C) 14 brings into engagement with a gear portion 1d of the lens from block 1 to rotate the lens front block 1 around the lens rotary shaft 22. Urging force is acted on the lens front block 1 by the snap spring (A) 16. When the lens change-over gear (A) 11 and the lens change-over gear (C) 14 are disengaged from each other, the lens front block 1 rotates until the urging direction of the urging force is generally reversed. Therefore, urging force acts on the lens front block 1 by the spring (A) 16 so that the lens front block 1 can be fixed to a lens positioning member (B) 24 under pressure. Then, the photographing lens is changed over into the Telephoto lens state, and thus the lens change-over gear (C) 14 always engaging with the lens front block 1 through the gear potions 1d and 14a is fixed to a position shown in FIGS. 4(f) and 4(g). The lens change-over gear (C) 14 and a lens change-over gear (B) 13 always engage with each other through the second gear portion 14b and a first gear portion 13a to be fixed to positions shown in FIGS. 4(f) and 4(g).

Figure 4B:
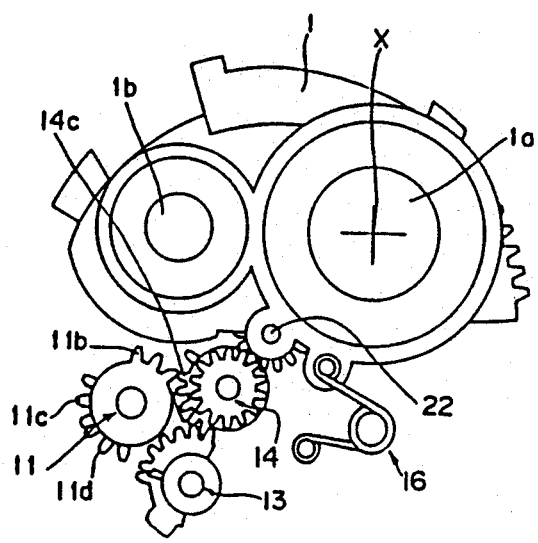
FIGS. 4(b), 4(d), 4(f), 4(h), 4(j), and 4(l) are respectively explanatory views showing an operation of a lens front block.
Figure 4D:
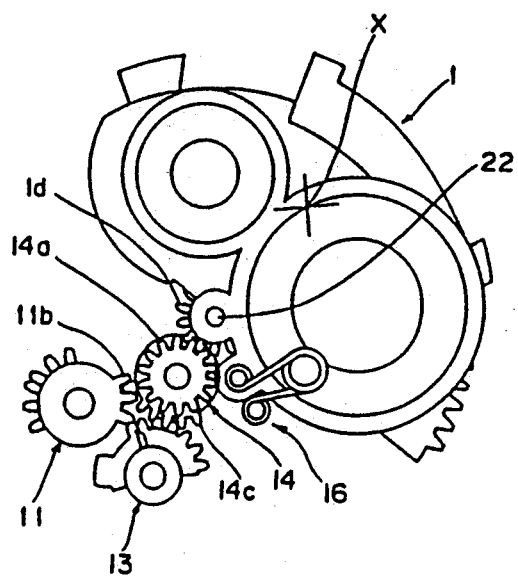
Figure 4C:
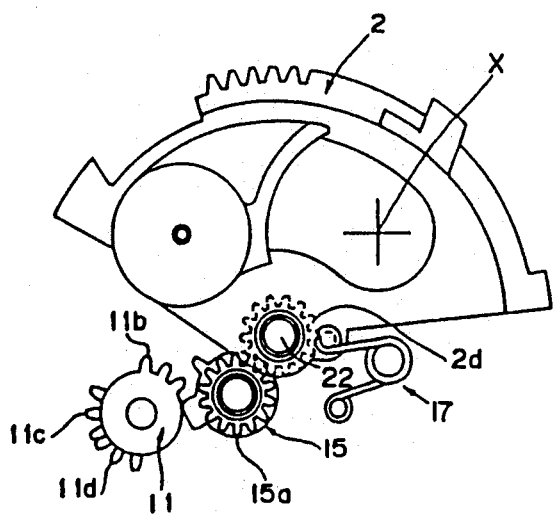
FIGS. 4(c), 4(e), 4(g), 4(i), 4(k), and 4(m) are respectively explanatory views showing an operation of a lens rear block.
Figure 4E:
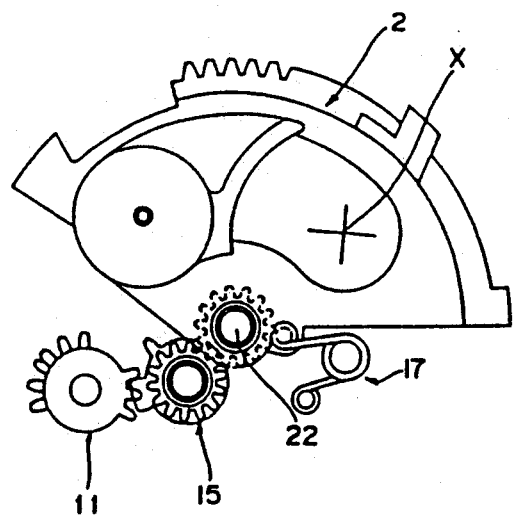
Figure 4F:
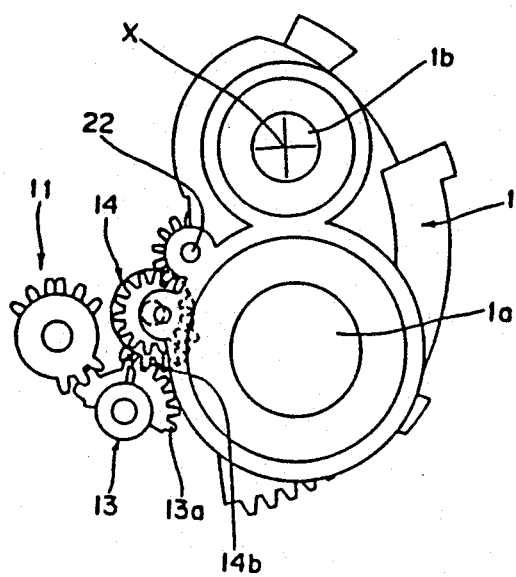
Figure 4H:
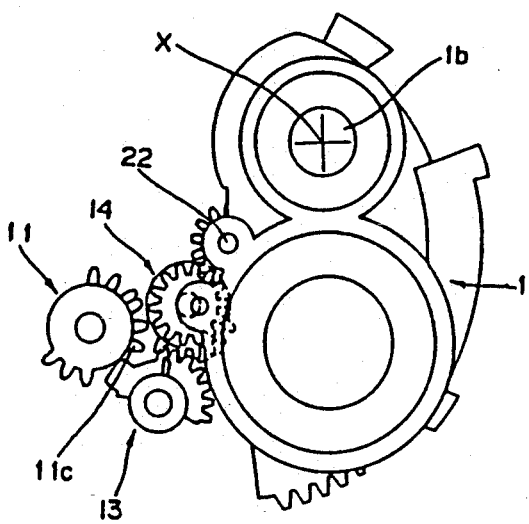
Figure 4G:
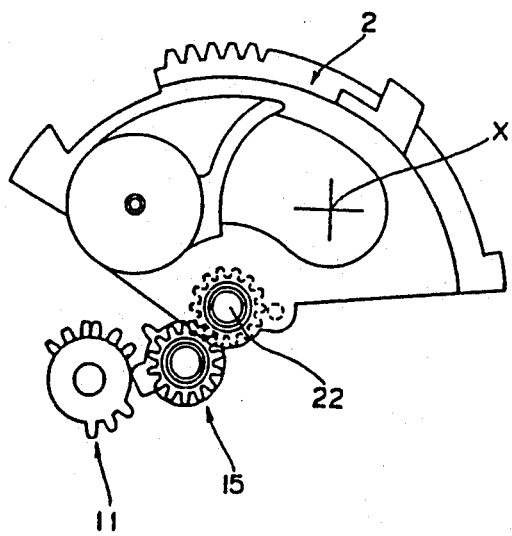
Figure 4I:
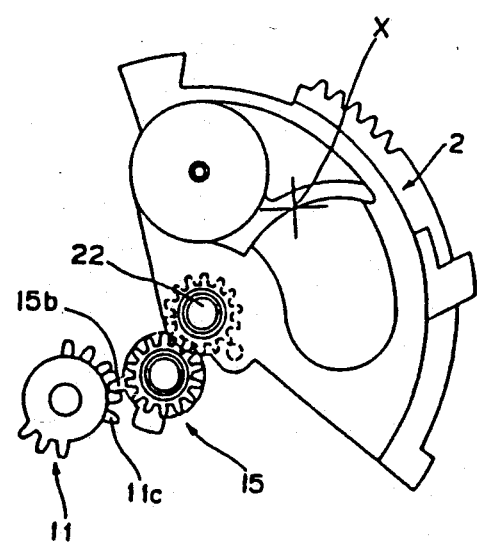
Figure 4J:
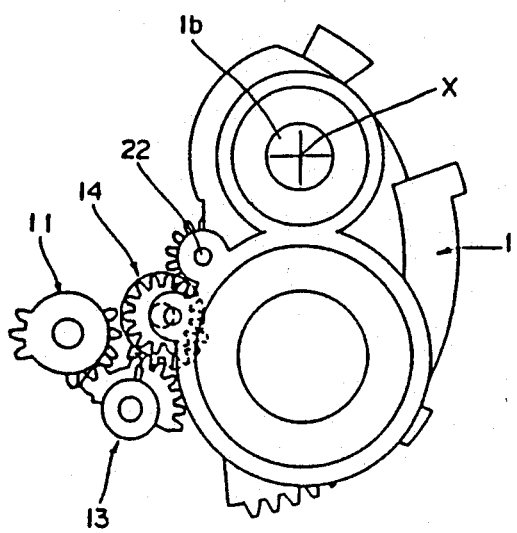
Figure 4L:
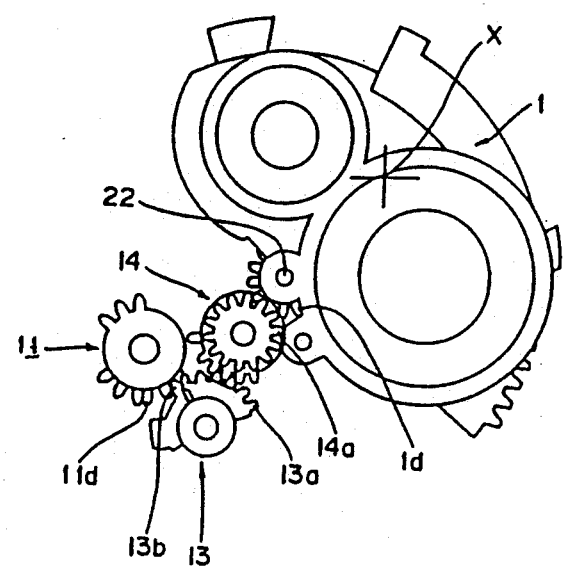
Figure 4K:
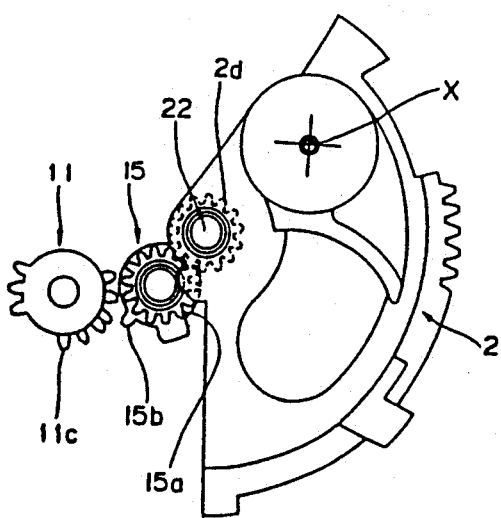
Figure 4M:
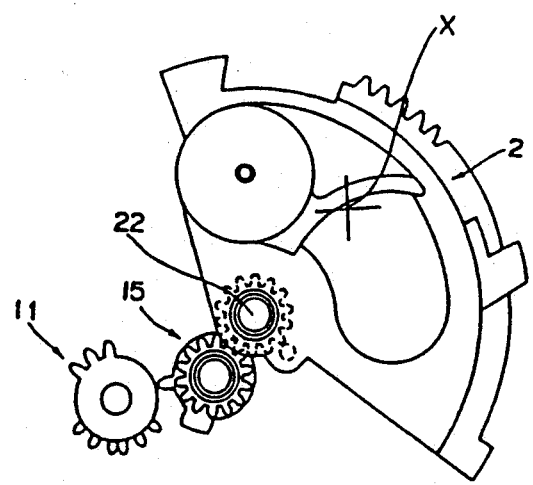

Next, the lens change-over operation from the Wide angle lens state to the Close-up lens state will be explained. The photographer turns on the Close-up switch 4 at S201, in FIG. 11(b) similarly to the operation for changing over therefrom to the Telephoto lens state, the motor 7 starts to rotate in the normal direction by the microcomputer 6 at S202. Then, similarly to the operation for changing over from the Wide angle lens state to the Close-up lens state, the lens change-over gear (A) 11 rotates in the normal direction. At this time, the motor 7 continues to rotate until the Close-up signal is outputted from the detecting means 12. That is, the motor 7 continues to rotate until the contacts 12b slides contacting on the base plate 12a and then stop at a position of approximately 240 degrees. Similarly to the operation for changing over from the Wide angle lens state to the Telephoto lens state, only the lens front block 1 rotates until the Telephoto signal is outputted from the detecting means 12, and then the primary optical system of the photographing lens is changed over into the primary optical system (B) 1b. Thereafter, during rotation until the Close-up signal is outputted from the detecting means 12, a second output gear portion 11c of the lens change-over gear (A) 11 brings into engagement with a second gear portion 15b of a lens change-over gear (C,) 15 as shown in FIGS. 4(h) and 4(i). As a result of the engagement, the lens rear block 2 engaging with a first gear portion 15a of the lens change-over gear (C,) 15 through a gear portion 2d of the lens rear block 2 rotates by rotation of the lens change-over gear (C,) 15. When both the gear portions 15a and 2d are disengaged with each other, the lens rear block 2 is fixed to the lens positioning member (B) 24 under pressure by the snap spring (B) 17 to be in a state shown in FIGS. 4(j) and 4(k), i.e., a state where the lens rear block 2 is changed over into a position of 90 degrees. After both the gears 15a and 2d are disengaged from each other and then it takes a slight period of time, the Close-up signal is outputted from the detecting means 12 at S203 and S204 to stop the motor 7 at S205. According to the operation, the lens rear block 2 is changed over into the position of 90 degrees and the secondary optical system (C) 2c is inserted at the imaging device side of the primary optical system (B) 1b to complete the operation for changing over to the Close-up lens state.

The operation for performing when the photographer stops operating the Telephoto switch 3 after changing over the photographing lens to the Telephoto lens, will be explained hereinafter. When the photographer stops operating the Telephoto switch 3 at S106, FIG. 11(a) the motor 7 starts to rotate in the normal direction by the microcomputer 6 at S107, and continues to rotate until the Wide angle signal is outputted from the detecting means 12. For performing the operation, it is necessary to think out the arrangement of the patterns of the detecting means 12 in the Close-up lens state as mentioned before. When the motor 7 continues to rotate, the lens change-over gear (A) 11 rotates from a position of 120 degrees to a position of 360 degrees (0 degree) in the normal direction. Therefore, by the engagement between both the gear portion 11c of the lens change-over gear (A) 11 and the gear portion 15b of the lens change-over gear (C') 15, the photographing lens passes through the region, shown in FIGS. 4(j) and 4(k), for changing over to the Close-up lens state, and thereafter by engagement, shown in FIGS. 4(l) and 4(m), between a third output gear portion 11d of the lens change-over gear (A) 11 and a second gear portion 13b of the lens change-over gear (B) 13, the lens change-over gear (B) 13 rotates in the reverse direction. Then, the lens change-over gear (C) 14 always engaging with the lens change-over gear (B) 13 through the gear portions 13a and 14b is caused to rotate in the normal direction. Thus, through the engagement between the gear portion 14a of the lens change-over gear (C) 14 and the gear portion 1d of the lens front block 1, the lens front block 1 rotates in the opposite direction to the change-over operation from the Wide angle lens to the Telephoto lens. Here, when both the gear portion 11d of the lens change-over gear (A) 11 and the gear portion 13b of the lens change-over gear (B) 13 are disengaged from each other, the lens front block 1 is fixed to a lens positioning member (A) 23 under pressure by the snap spring (A) 16 so that the position of the lens front block 1 is fixed to return the Wide angle lens state. At this time, the Wide angle signal is outputted from the detecting means 12 at S108 and S109 and the motor 7 is in a state to stop rotating at S110.

According to the above description, it seems that the rotary force outputted from the motor 7 is transferred only to the lens front block 1 for rotation thereof by the engagement between both the gear portions 11d and 13b of the lens change-over gears (A) 11 and (B) 13. In the embodiment, however, the lens front block 1 and the lens rear block 2 are constructed to have such configurations that the lens rear block 2 is pressed by the lens front block 1 when the lens front block 1 returns from the position in the Close-up lens state to the position in the Wide angle lens state, and thus the lens rear block 2 also returns to the Wide angle state to be fixed to the lens positioning member (A) 23 under pressure by the snap spring (B) 17, with the result that the lens rear block 2 is in the Wide angle state as shown in FIGS. 4(b) and 4(c). That is, as shown in FIG. 10, the lens rear block 2 has an upstanding wall 21. The wall 21 and a first annular stray light prevention wall 1k of the lens front block 1 are overlapped backward and forward. Therefore, the wall 21 is pressed by the wall 1k as the lens front block 1 moves in the way shown in from FIG. 4(j) to FIG. 4(b) through FIG. 4(l), and then the lens rear block 2 moves in the way shown in from FIG. 4(k) to FIG. 4(c) through FIG. 4(m).

Next, the operation which is performed when the photographer stops the operation of the Close-up switch 4 after the photographing lens is changed over to the Close-up lens state will be explained. When the photographer stops operating the switch 4 at S206, in FIG. 11(b) the motor 7 continues to rotate in the normal direction at S207 until the Wide angle signal is outputted from the detecting means 12, similarly to the case where the photographer stops operating the switch 3 in the Telephoto lens state. In this case, by the engagement between the third output gear 11d of the lens change-over gear (A) 11 and the gear portion 13b of the lens change-over gear (B) 13 similarly to the case where the photographer stops operating the switch 4 in the Telephoto lens state, the lens front block 1 and the lens rear block 2 return to the Wide angle lens state shown in FIG. 4(b) and 4(c) and then, after the Wide angle signal is outputted at S208 and S209, the motor 7 stops rotating at S210.

The lens change-over operation has been explained above and the feature of the operation according to the embodiment is such one way loop-like operation that the Wide angle lens→the Telephoto lens→the Close-up lens→the Wide angle lens, in which the lenses are changed over by only one way rotation of the motor 7.

Next, the operation for photographing will be explained hereinafter.

Figure 11C:
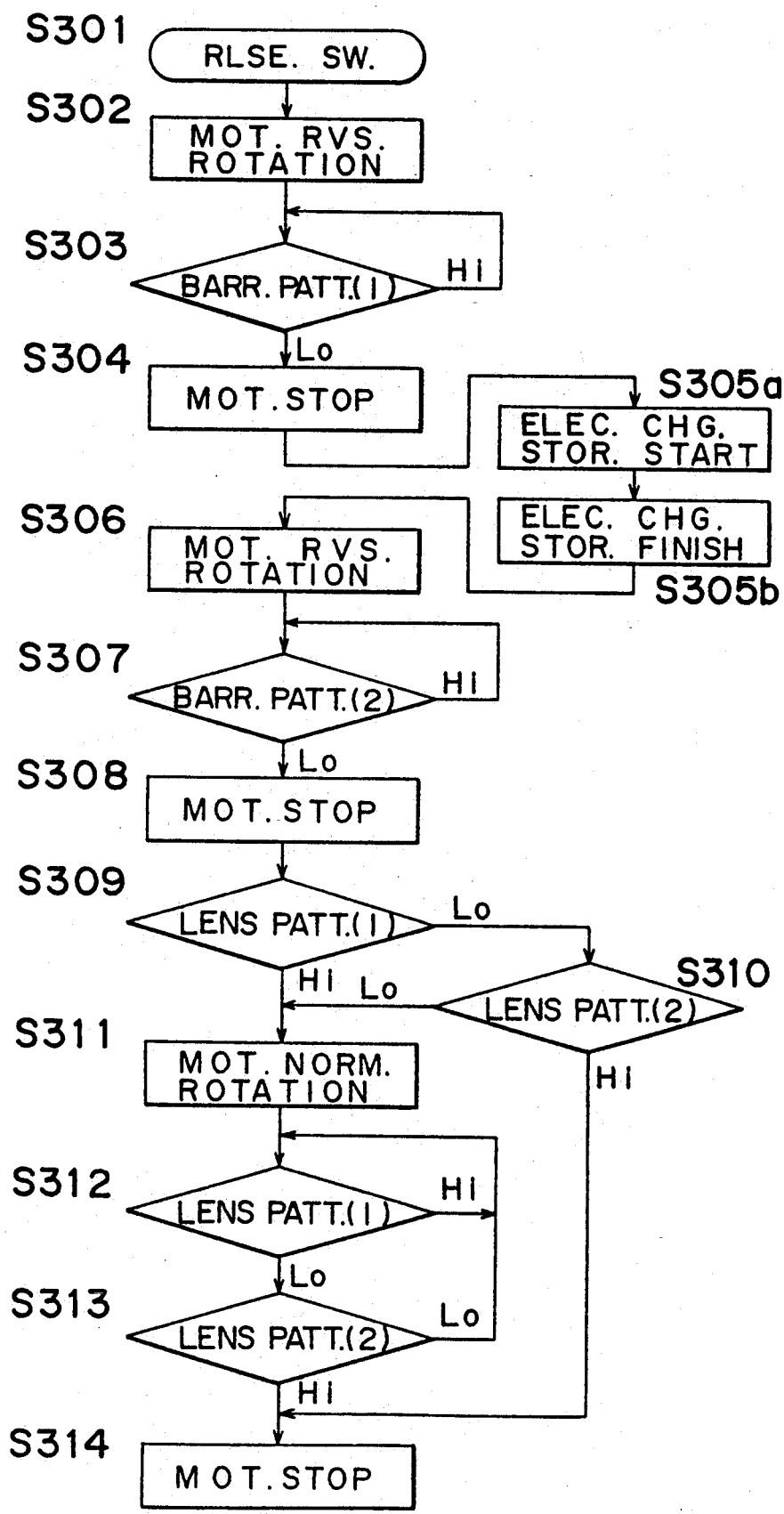
FIG. 11(c) is a flow chart of a barrier opening and closing operation.
Figure 12:
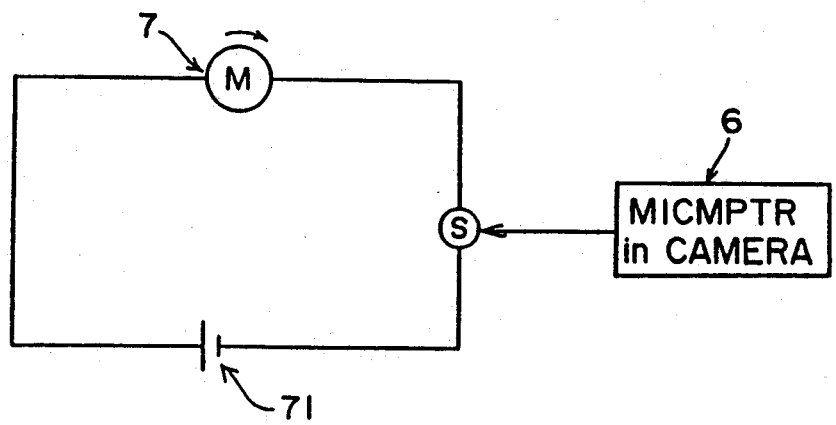
FIG. 12 is a circuit diagram of the magnification change mechanism of the camera according to the embodiment.
Figure 13:
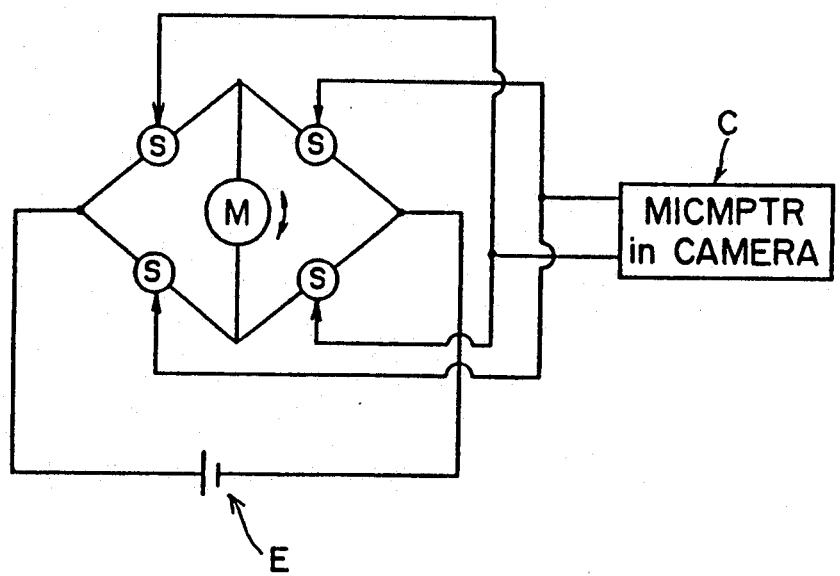
FIGS. 13 and 14 are respectively a circuit diagram and an explanatory view showing a conventional change-over mechanism.
Figure 14:
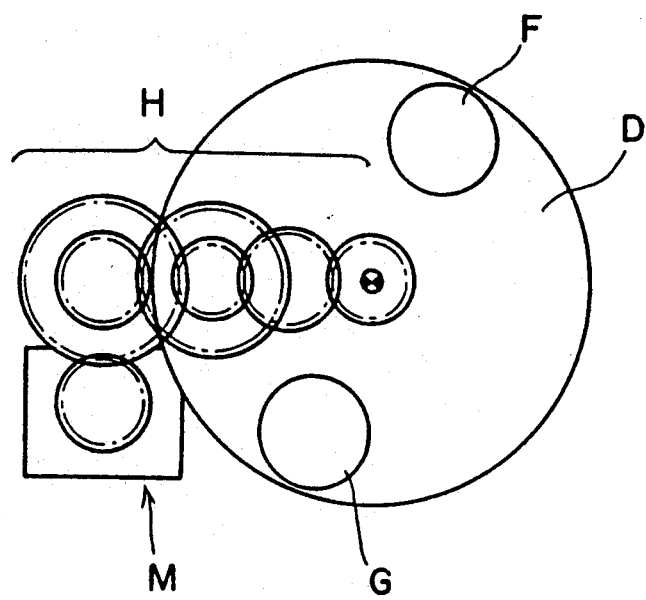

First, the operation in a case where the photographer turns on the release switch 5 in the Wide angle lens state is explained based on FIG. 11(c). When the photographer turns on the release switch 5 at S301, a signal is inputted into the microcomputer 6 and then the motor 7 rotates in the opposite direction to that in the lens change-over operation by the microcomputer 6 at S302 (which is called as "reverse rotation" hereinafter). Then, the sun gear 9 rotates in the reverse direction through the reduction gear 8 so that the planetary gear 10 separates from the lens change-over gear (A) 11 and is brought into engagement with a barrier driving gear 51. Therefore, the rotary force is transferred from the planetary gear 10 to the barrier driving gear 51 to rotate the gear 51 in the reverse direction. A barrier state-detecting means 52 is arranged at the barrier driving gear 51. Barrier opening signals are outputted into the microcomputer 6 at the position of the barrier driving gear 51 corresponding to a barrier opening position at S303 and then the motor 7 stops at S304. On the basis of generating the barrier opening signals, the imaging device 25 starts an electric charge storage at S305a. After termination of the charge storage at S305b, the motor 7 rotates in the reverse direction again at S306, the barrier driving gear 51 rotates in the reverse direction, and barrier closing signals are outputted from the barrier state-detecting means 52 at the position of the barrier driving gear 51 corresponding to a barrier closing position at S307. Thus, the motor 7 stops rotating at S308.

Figure 6A:
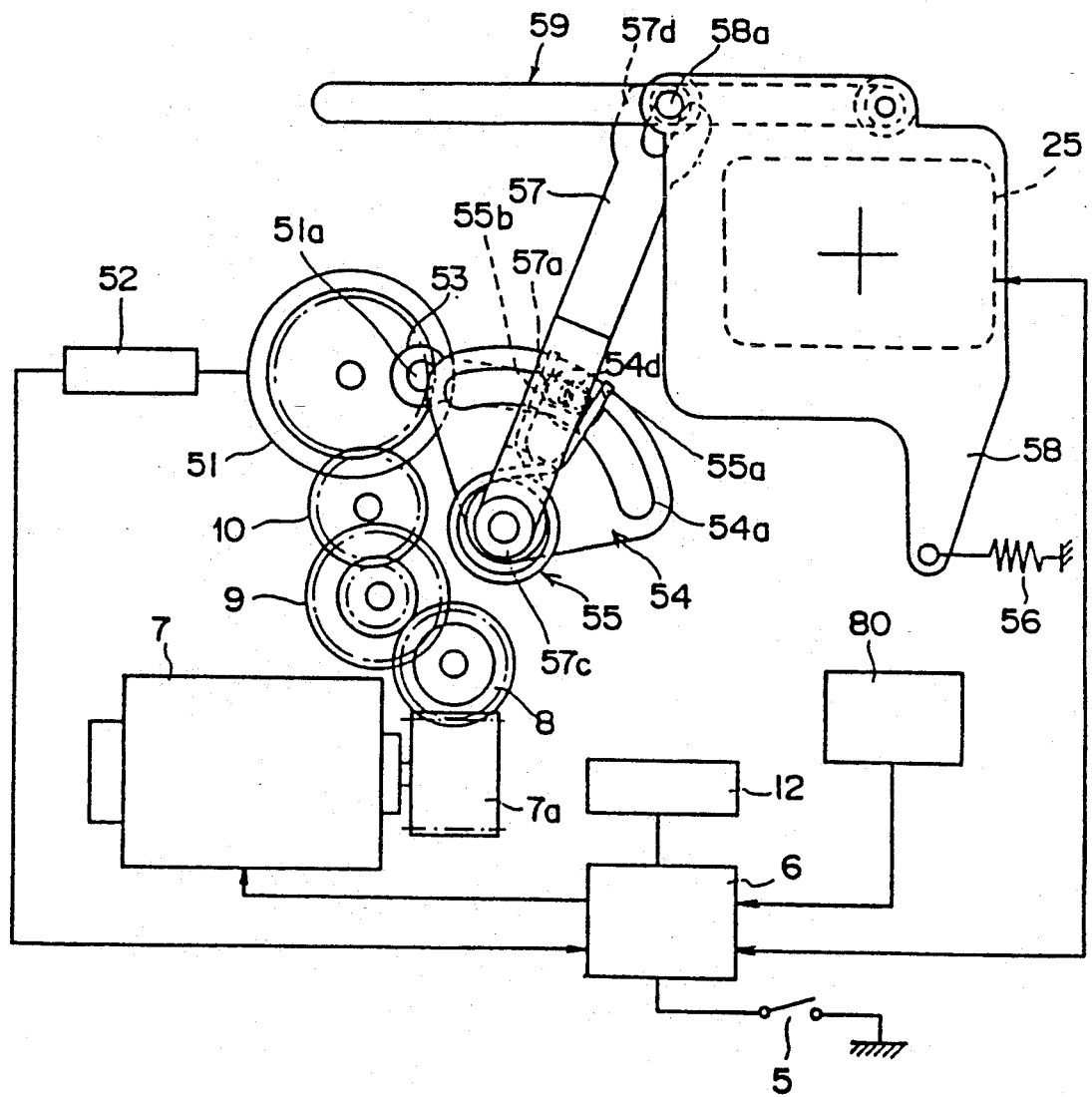
FIGS. 6(a), 6(b), 6(c) and 6(d) are explanatory views showing a barrier opening and closing operation.
Figure 6B:
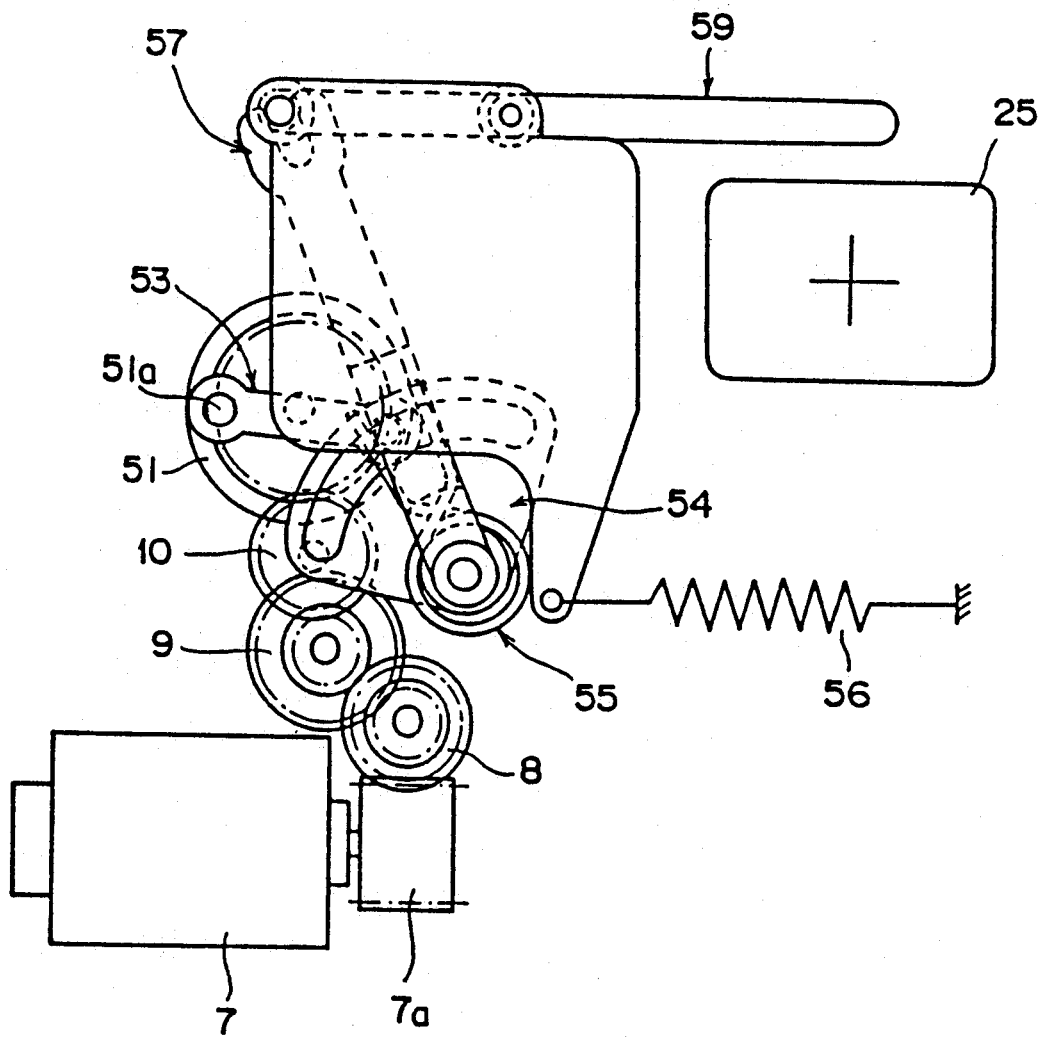

Hereinafter, the operation of the lens barrier will be briefly explained based on FIG. 6. FIG. 6(a) shows a barrier closing state and FIG. 6(b) shows a barrier opening state. When the barrier driving gear 51 is in the state shown in FIG. 6(a), the barrier closing signals are outputted from the barrier state-detecting means 52. When the barrier driving gear 51 is in the state shown in FIG. 6(b), the barrier opening signals are outputted from the barrier state-detecting means 52. Here, as shown in Table 3, one of the barrier opening signals is low at a barrier pattern (1) and the other is high at a barrier pattern (2). One of the barrier closing signals is high at the barrier pattern (1) and the other is low at the barrier pattern (2).

TABLE 3

|  | barrier opening | during change-over | barrier closing |
|---|---|---|---|
| barrier pattern (1) | Low | High | High |
| barrier pattern (2) | High | High | Low |

A crank chain for opening and closing the barrier will be first explained. The lens barrier 58 moves between the barrier closing position where the barrier 58 is inserted in a space between each lens and the imaging device 25 to shield light emitting from the lens to the device 25 and the barrier opening position where the barrier 58 is retracted from the space between the lens and the device 25, while guiding by a barrier guide 59. That is, a projection 58a arranged at the lower end of the barrier 58 in FIG. 6 moves in a groove of the barrier guide 59, so that the barrier 58 smoothly moves between both the barrier opening and closing positions. The barrier 58 is always biased toward the barrier closing position by a barrier spring (B) 56. That is, as shown in FIG. 6(g), the barrier spring (B) 56 actually is a torsion spring. While cocked in a direction shown by an arrow in FIG. 6(e), one end 56a of the spring (B) 56 engages with a projection 57b arranged on the upper surface of a barrier driving lever (B) 57 and the other end 56b thereof engages with a fixed portion. One end 57d of the barrier driving lever (B) 57 is pivotably attached to the upper end of the barrier 58 in FIG. 6. As shown in FIG. 6(e), the other end 57c of the barrier driving lever (B) 57 is pivotably attached to a base end 54c of a barrier driving connecting plate 54 having approximately sector configuration. The lever (B) 57 has a projection 57a at the lower surface of a middle portion between the one end 57d and the other end 57c. The connecting plate 54 has a circular arc-like-extending recessed groove 54a at the surface thereof on the barrier driving lever side thereof. The projection 57a of the barrier driving lever (B) 57 is engaged into the groove 54a to be capable of moving therealong. One end of a barrier driving lever (A) 53 is pivotably attached to the rear surface of the connecting plate 54 by a pivot pin 54d arranged at the lower surface of the connecting plate 54. On the other hand, the other end of the lever (A) 53 is pivotably attached on the upper surface of the barrier driving gear 51 by a pivot pin 51a. As shown in FIG. 6(f), the winding portion of a barrier spring (A) 55 is fitted concentrically with a pivot pin of the lever (B) 57 and the connecting plate 54, and a projection 54b of the barrier driving connecting plate 54 and the projection 57a of the barrier driving lever (B) 57 are pinched by both the ends 55a and 55b after cocked as shown by an arrow in FIG. 6(e).

Turning-on the release switch 5 causes the motor 7 to start rotating in the reverse direction at S301. When the barrier driving gear 51 rotates in the reverse direction at S302, the barrier driving connecting plate 54 rotates in the reverse direction by the crank chain among the barrier driving gear 51, the barrier driving lever (A) 53, and the barrier driving connecting plate 54. Then, the projections 57a and 54b are pinched between both the ends 55a and 55b of the barrier spring (A) 55 and thus the barrier driving lever (B) 57 rotates similarly to the barrier driving connecting plate 54. Therefore, the lens barrier 58 moves regulating by the lens guide 59 to be from the state shown in FIG. 6(a) into the barrier opening state shown in FIG. 6(b). Then, the barrier opening signals are outputted from the barrier state-detecting means 52 to the microcomputer 6, resulting in stopping of the rotation of the motor 7 at S304. By outputting the barrier opening signals into the microcomputer 6, the electric charge storage of the device 25 starts at S305.

The time from start to termination of the electric charge storage depends on the result of the light measuring of the light measuring unit 80 and the device 25 is controlled by the microcomputer 6.

After termination of the electric charge storage of the device 25, an electric charge termination signal is outputted from the device 25. Then, the motor 7 starts rotating in the reverse direction by the microcomputer 6 again at S306 and the barrier driving gear 51 also rotates in the reverse direction again. Here, the barrier driving connecting plate 54 rotates in the normal direction by the crank chain among the barrier driving gear 51, the barrier driving lever (A) 53, and the barrier driving connecting plate 54. Then, by the barrier spring (A) 55, the barrier driving lever (B) 57 rotates similarly to the barrier driving connecting plate 54, thereby, the lens barrier 58 moves in a closing direction while being regulated by the barrier guide 59. Thus, the barrier 58 goes from the state shown in FIG. 6(b) into the barrier closing state shown in FIG. 6(a). As a result, the barrier closing signals are outputted from the barrier state-detecting means 52 at S307, resulting in stopping of the rotation of the motor 7 by the microcomputer 6 at S308.

Figure 6C:
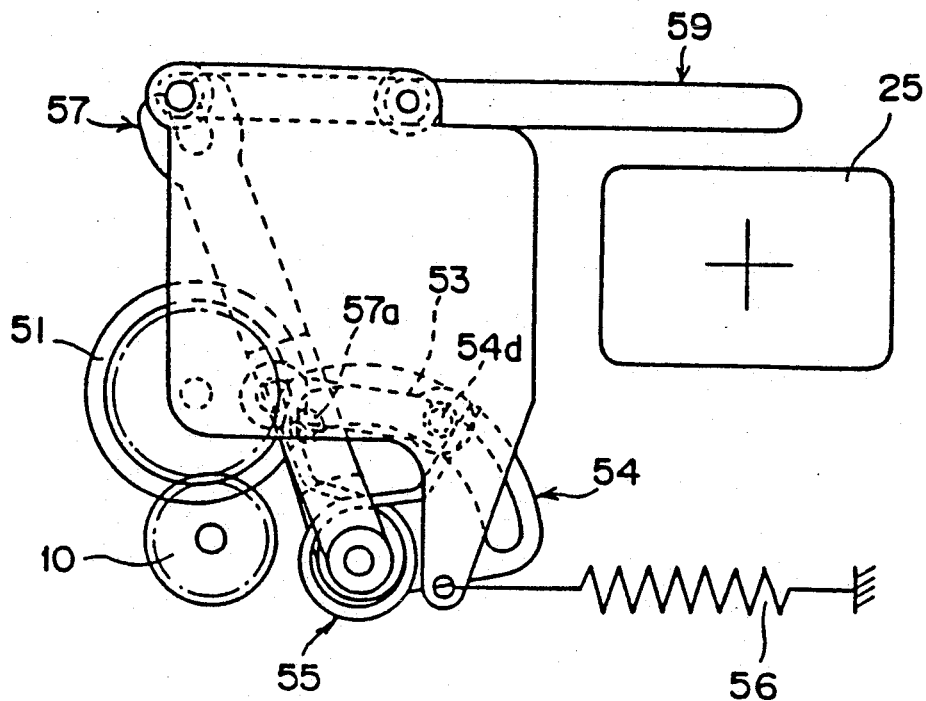
Figure 6D:
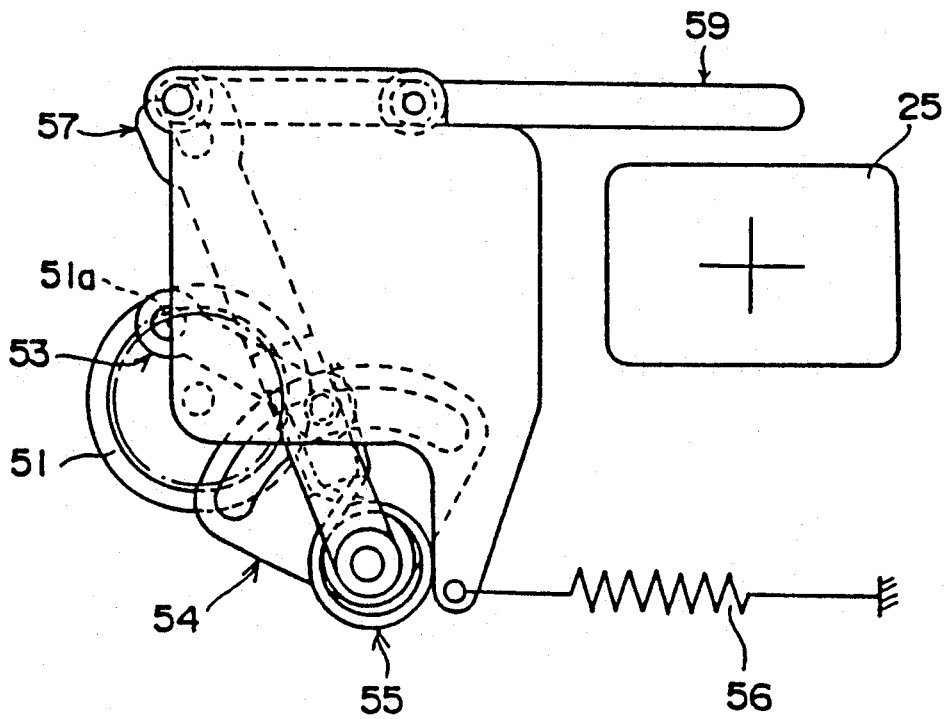
Figure 6E:
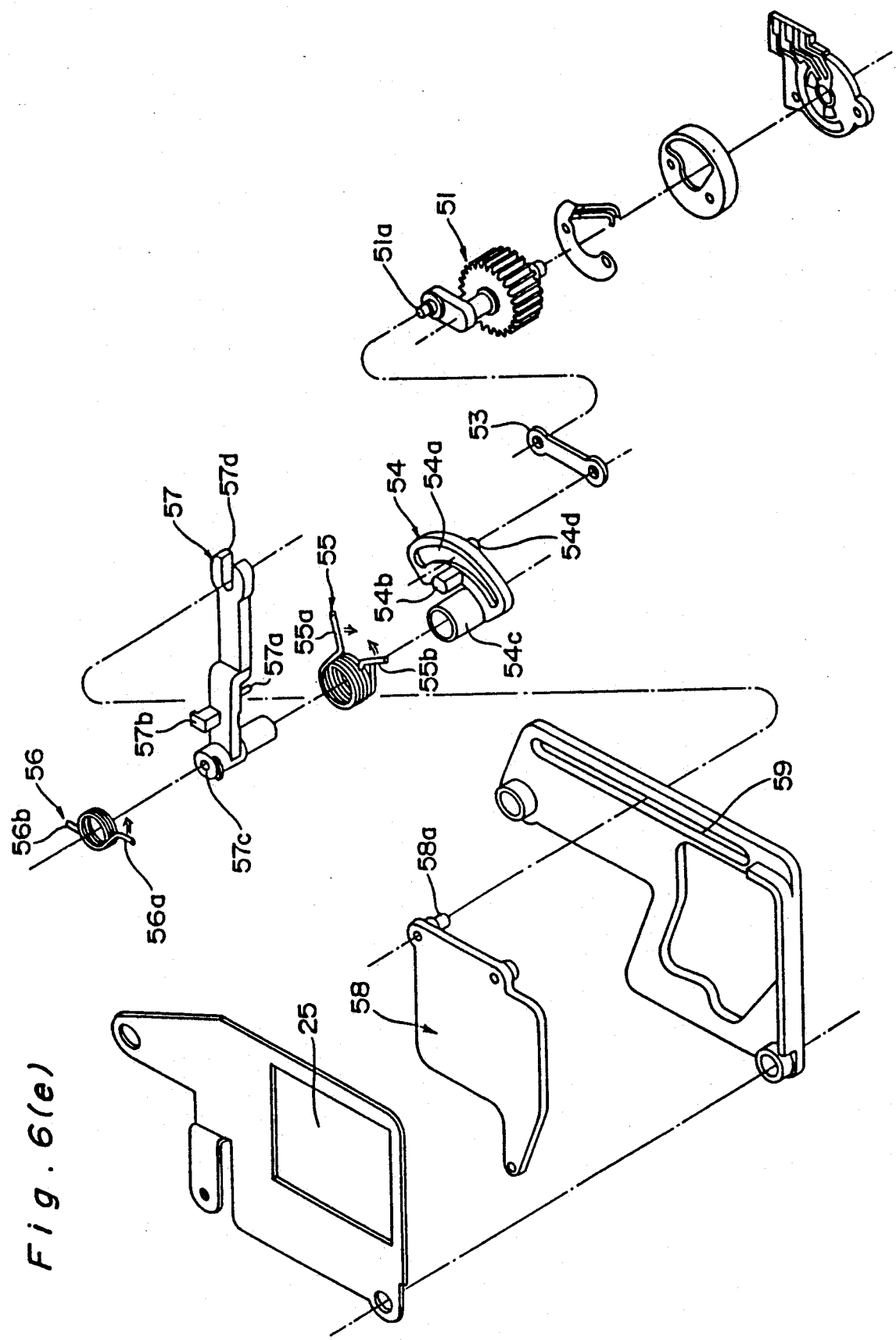
FIGS. 6(e), 6(f) and 6(g) are explanatory views of a barrier driving mechanism.
Figure 6F:
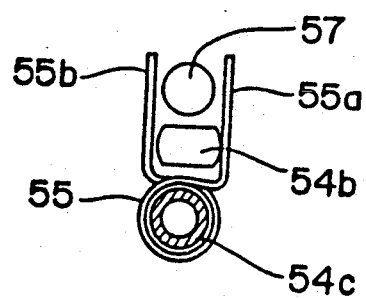
Figure 6G:
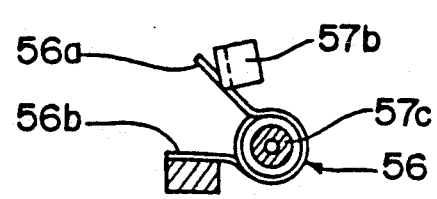

The operation in a case where outside force is acted on the lens barrier 58 to open in the barrier closing state such as where the photographer forcedly tries to open the lens by his or her hands is separated into two cases; the first one is in a case where the barrier driving gear 51 engages with the planetary gears 10 as shown in FIG. 6(c), the second one is in a case where the barrier driving gear 51 does not engage with the planetary gears 10 as shown in FIG. 6(d).

First, as shown in FIG. 6(c), in the case where the barrier driving gear 51 engages with the planetary gears 10, since the planetary gears 10 engage with the motor 7 through the gears, the barrier driving gear 51 can not rotate and the barrier driving lever (A) 53 and the barrier driving connecting plate 54 remain stationary. When the lens barrier 58 is opened by the outside force, the position of the barrier driving lever (B) 57 changes on the basis of the movement of the lens barrier 58. As a result, since the relative relation between the barrier driving connecting plate 54 and the barrier driving lever (B) 57 changes, the plate 54 and the lever (B) 57 are connected with the barrier spring (A) 55 to prevent any breakage. In this state, the barrier spring (A) 55 is cocked which ends are engaged with the pivot pin 54d and the projection 57a. Therefore, when the outside force is not acted thereon, the lens driving lever (B) 57 is returned to the closing position by the urging force of the barrier springs (A) 55 and (B) 56, and thus the lens barrier 58 is returned to be in the closing state.

On the other hand, in the case where the barrier driving gear 51 does not engage with the planetary gears 10, as shown in FIG. 6(d), by the outside force for trying to open the barrier, not only the lens barrier 58 and the barrier driving lever (B) 57 but also the barrier driving connecting plate 54, the barrier driving lever 53, and the barrier driving gear 51 are changed in positions. Since the barrier spring (B) 56 is cocked by the outside force, when the outside force is not acted thereon, the lens driving lever (B) 57 is returned to the closing position by the urging force of the barrier spring (B) 56. Consequently, the lens barrier 58 is also in the closing state and the barrier driving connecting plate 54, the barrier driving lever (A) 53, and the barrier driving gear 51 are returned to the closing states.

Although the above operation is performed in the case where the photographer turns on the release switch 5 in the Wide angle lens state, the operation in a case where the photographer turns on the switch 5 in the Telephoto lens state will be explained hereinafter. That is, turning-on the switch 5 at S301 causes the motor 7 to rotate in the reverse direction by the microcomputer 6 at S302, the lens barrier 58 is opened at S303, the microcomputer 6 causes the motor 7 to rotate in the reverse direction after exposure, and the lens barrier 58 is closed. The above operation from turning on the switch 5 to closing the barrier 58 is identical with that in the case where the switch 5 is turned on in the Wide angle lens state at S304-S308. When the barrier closing signals are inputted into the microcomputer 6 by the barrier state-detecting means 52, the signal of the lens state-detecting means 12 is the Telephoto signal at S309, with the result that the motor 7 starts to rotate in the normal direction by the microcomputer 6 at S311. From that moment on, the same operation is performed as that in the case where the photographer stops operating the Telephoto switch in the Telephoto lens state mentioned above, with the result that the photographing lens is returned to the Wide angle lens state.

In a case where the photographer turns on the release switch 5 in the Close-up lens state, turning-on the release switch 5 at S301 causes the motor 7 to rotate in the reverse direction by the microcomputer 6 at S302, the lens barrier 58 is opened at S303, the motor 7 rotates in the reverse direction again by the microcomputer 6 at S304-S306 after exposure, and the lens barrier 58 is closed at S307 and S308. The above operation from turning on the switch 5 to closing the barrier 58 is identical with that in the case where the release switch 5 is turned on in the Wide angle lens state. At the moment when the barrier closing signals are inputted from the barrier state-detecting means 52 into the microcomputer 6, the signal of the lens state detecting means 12 is the Close-up signal at S309 and S310. Therefore, the motor 7 starts rotating in the normal direction by the microcomputer 6 at S311. From that moment on, the same operation is performed as that in the case where the photographer stops operating the Close-up switch in the Close-up lens state mentioned above, with the result that the photographing lens is returned to the Wide angle lens state.

Although the operation of the lens barrier and the photographing lens during a photographing period have been explained above, if one of signals such as the Telephoto signal, the Close-up signal, and the change-over signal, that is, different from the Wide angle signal, has been outputted from the lens state-detecting means 12 at S309 and S310 at the moment when the barrier closing signals are outputted from the barrier detecting means 52, the microcomputer 6 causes the motor 7 to rotate in the normal direction at S311 and then the photographing lens moves until the Wide angle signal is outputted from the lens state-detecting means 12, at S312-S314.

In the mechanisms for performing each operation, the lens change-over operation by engagement between partially toothed gears (I) 101 and (II) 102 as shown in FIG. 7(a) has been explained. If both the gears 101 and 102 have teeth configuration shown in FIG. 7(a), it is necessary for the tooth first contacting with the corresponding gear to have strength because impact force is acted on the tooth different from normal teeth. Therefore, as shown FIG. 7(b), each of the gears 101 and 102 is required to have a deposit portion for insurance.

That is, a deposit portion 101a for reinforcement shown by slanting lines region is formed between a first tooth 101b and a second tooth 101c of the driving gear (I) 101 at the first tooth 101b thereof. On the other hand, at a portion of the driven gear (II) 102 which corresponds to the deposit portion 101a, that is, a distal end of a second tooth 102c of the driven gear (II) 102, a notch portion 102d cut in corresponding to the deposit portion 101a is formed. Thus, in engaging the gear 101 with the gear 102, the notch portion 102d and the deposit portion 101a engage with each other while confronting therewith, with the result that the first tooth 101b of the driving gear (I) 101 naturally can engage with the second tooth 102c of the driven gear (II) 102 without any load in the engagement. It is possible to form a deposit portion 102a for reinforcement which is freely designed to some extent not to interfere with other mechanism elements at the opposite side of the first tooth 102b to the second tooth 102c of the driven gear (II) 102 as shown by the slanting lines region in FIG. 7(b). It is impossible for the region to engage with the first tooth 101b of the driving gear (I) 101. Such deposit portions 101a and 102a formed on each of the gears 101 and 102 allow each of the first teeth 101b and 102b of the driving gear (I) 101, on which the impact force is acted, and the driven gear (II) 102 to have sufficient strength.

Next, a viewfinder change-over operation which is simultaneously performed with the lens change-over operation mentioned above will be explained. A viewfinder optical system is set to be in a standard state when the photographing lens is the Telephoto lens. When the photographing optical system is in the Wide angle lens state, a wide angle converter secondary optical system block 41 is inserted at the object side of a viewfinder primary optical system, and when the photographing optical system is in the Close-up lens state, a wedge lens block 45 for decreasing parallax is inserted at the object side of the viewfinder primary optical system. The operation thereof will be explained hereinafter.

Figure 8A:
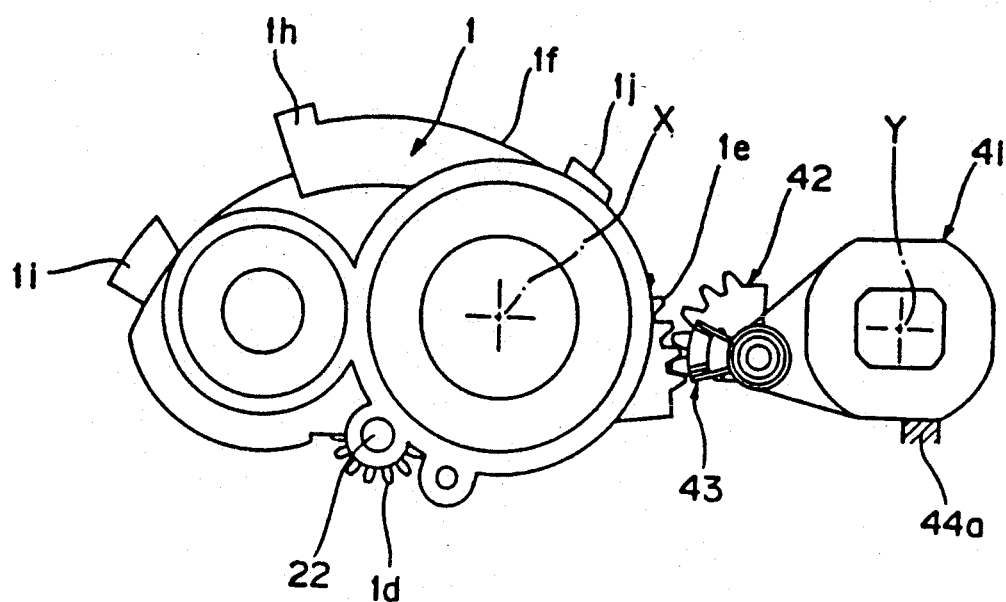
FIGS. 8(a) and 8(b) are explanatory views of a viewfinder change-over operation of a wide angle lens.
Figure 8B:
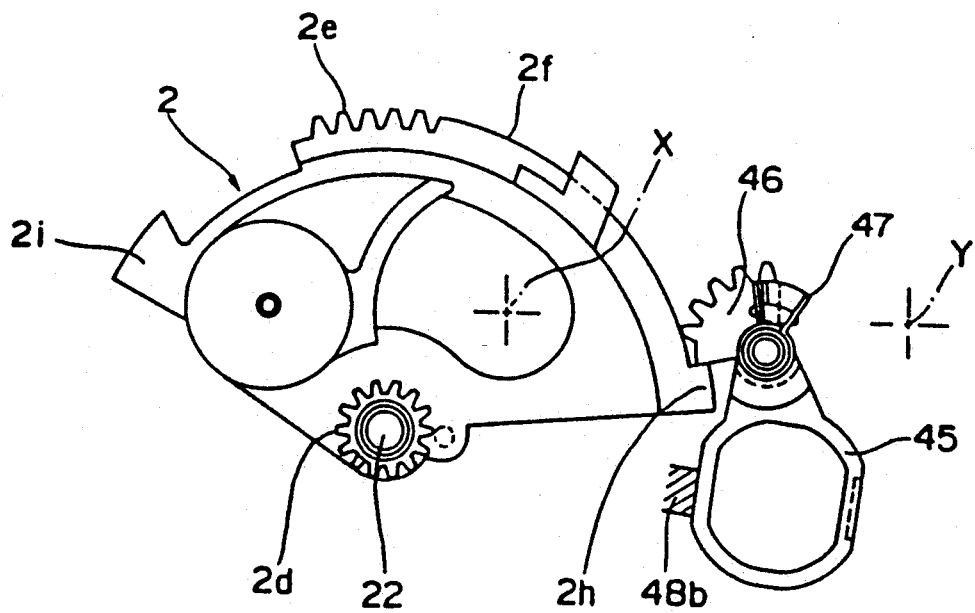
Figure 8C:
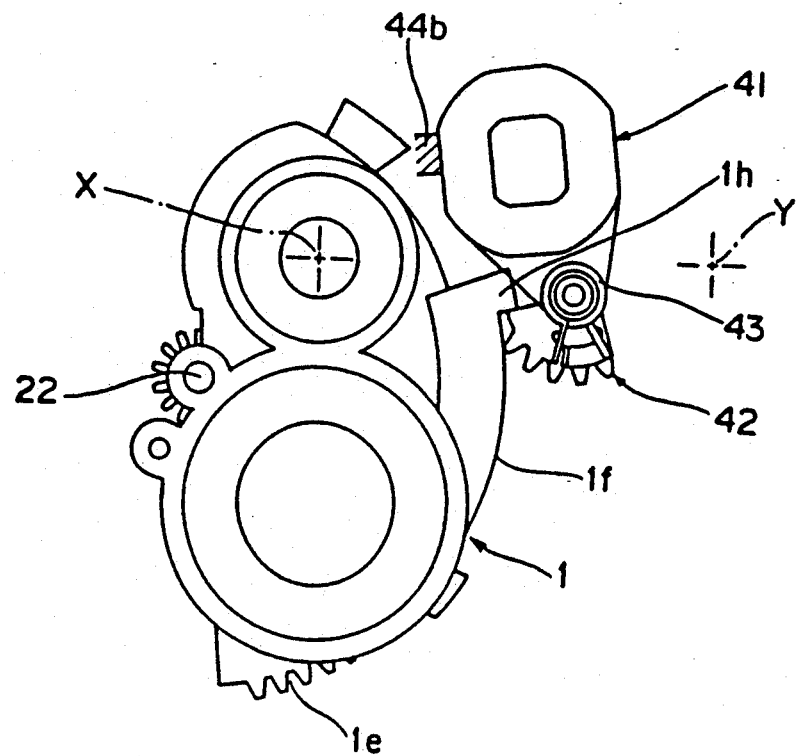
FIGS. 8(c) and 8(d) are explanatory views of a viewfinder change-over operation of a Telephoto lens.
Figure 8D:
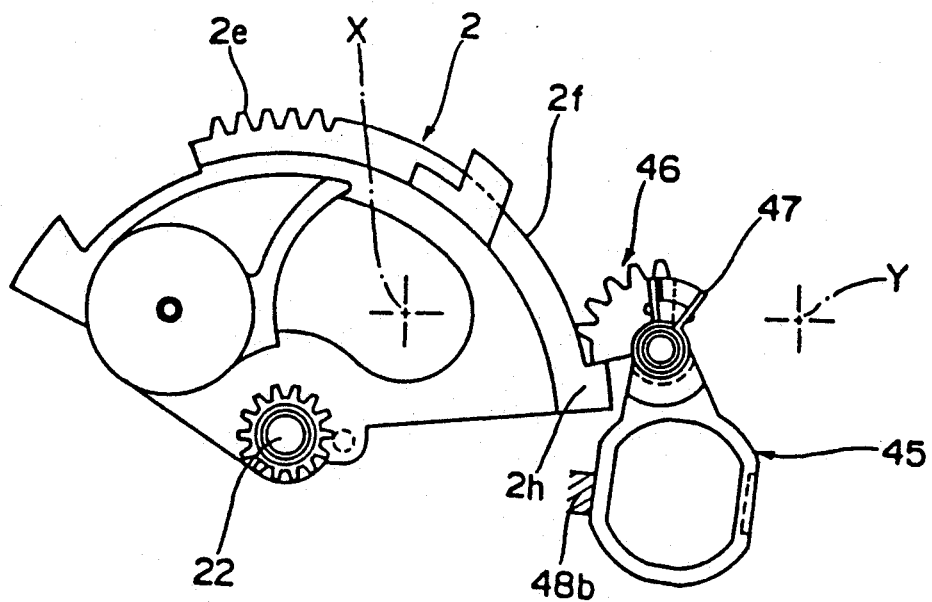
Figure 8E:
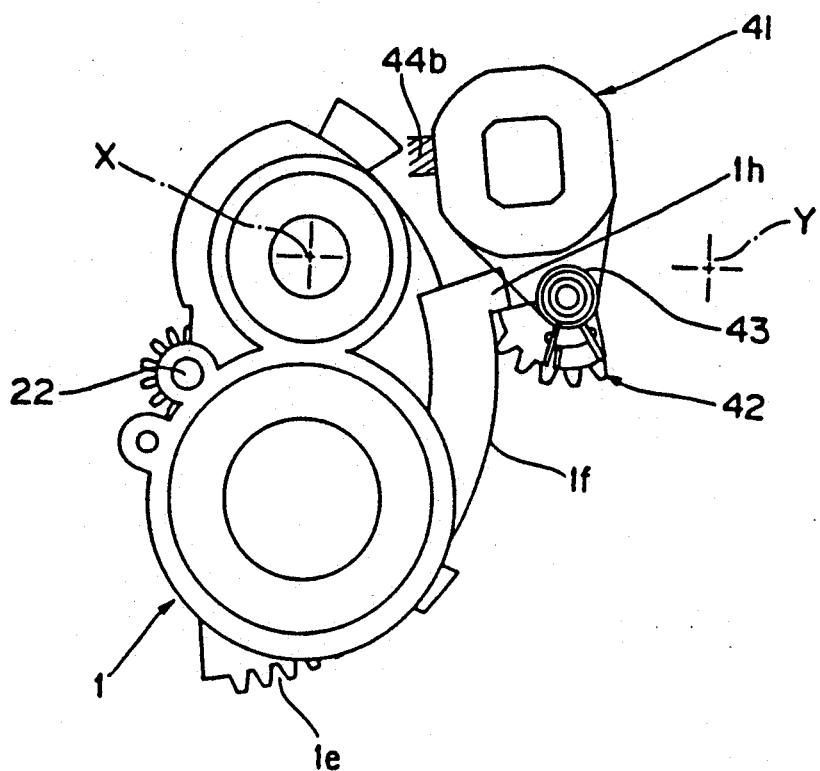
FIGS. 8(e) and 8(f) are explanatory views of a viewfinder change-over operation of a Close-up lens.
Figure 8F:
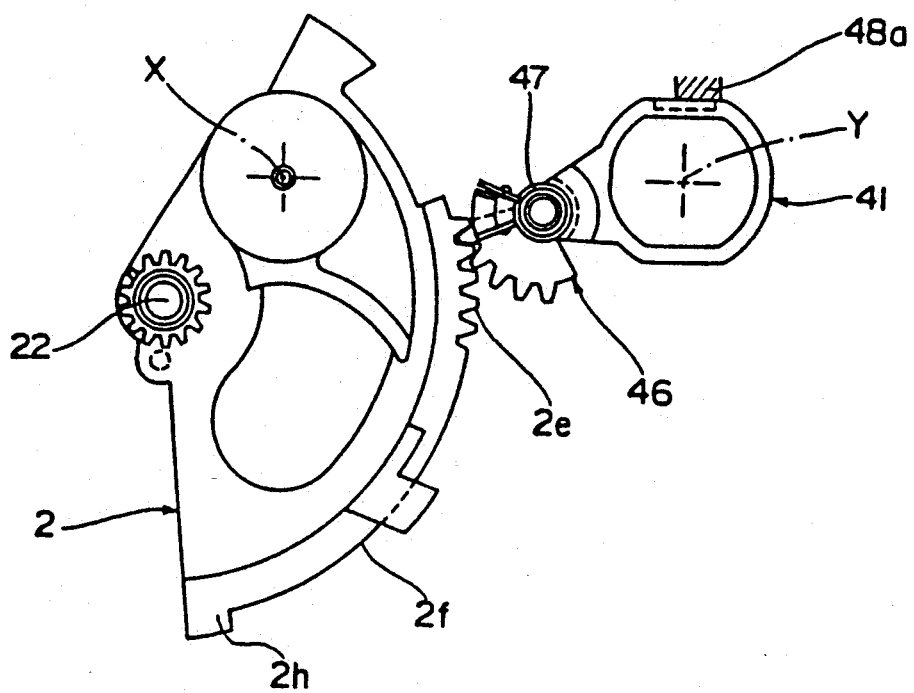
Figure 8G:
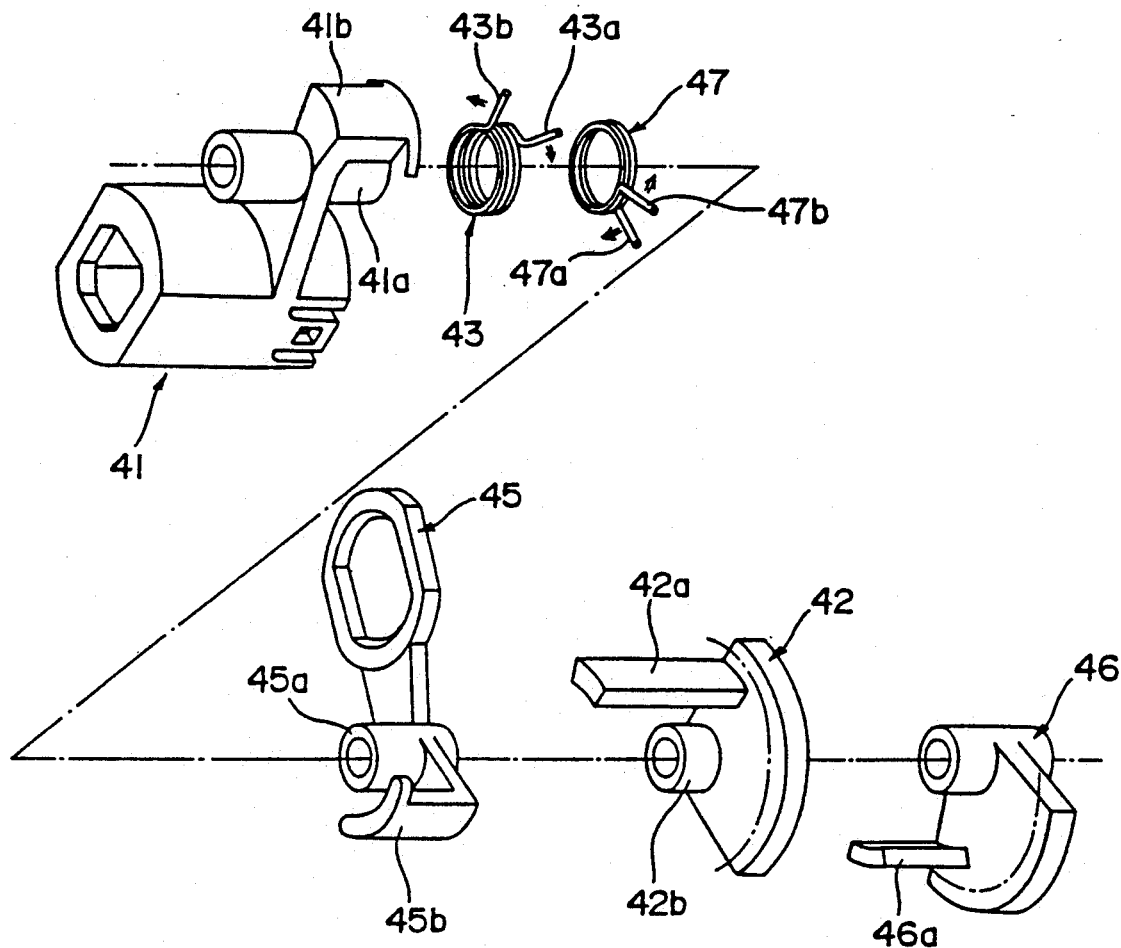
FIGS. 8(g), 8(h) and 8(i) are explanatory views of a mechanism for performing a viewfinder change-over operation.
Figure 8H:
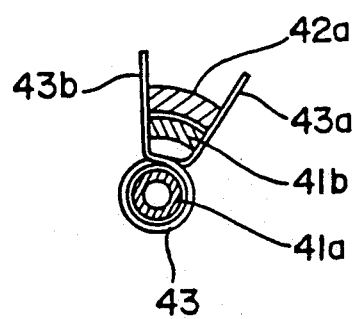
Figure 8I:
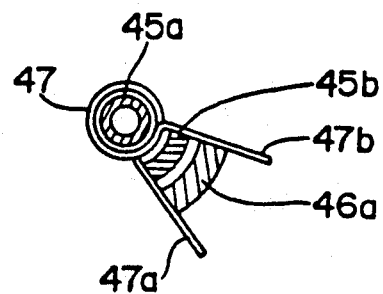

FIGS. 8(a)-8(f) show a viewfinder change-over operation in the three states of the photographing lens. FIGS. 8(a) and 8(b) show the Wide angle lens state, FIGS. 8(c) and 8(d) show the Telephoto lens state, and FIGS. 8(e) and 8(f) show the Close-up lens state. For simplification of the drawings, FIGS. 8(a), 8(c), and 8(e) show an operation of the lens front block 1 and the Wide angle converter secondary optical system block 41, and FIGS. 8(b), 8(d), and 8(f) show an operation of the lens rear block 2 and the wedge lens block 45. FIGS. 8(g)-8(i) show a mechanism for performing the above change-over operation. In the figures, a cylinder portion 41a of the block 41, a cylinder portion 45a of the wedge lens block 45, a cylinder portion 42b of a Wide angle converter gear 42, and a cylinder portion 46a of a wedge gear 46 are pivotably arranged to be concentric with each other. A Wide angle converter spring 43 and a wedge spring 47 are arranged between the block 41 and the wedge lens block 45. The winding portion of the Wide angle converter spring 43 is fitted to the cylinder portion 41a of the block 41 as shown in FIG. 8(h) and both ends 43a and 43b thereof are cocked in a direction shown by an arrow, so that a projecting portion 41b of the block 41 and a projection 42a of the Wide angle converter gear 42 are pitched therebetween. The winding portion of the wedge spring 47 is fitted to the cylinder portion 45a of the wedge lens block 45 as shown in FIG. 8(i) and both ends 47a and 47b thereof are cocked in a direction shown by an arrow, so that a projecting portion 45b of the wedge lens block 45 and the projection 46a of the wedge gear 46 are pinched therebetween.

First, the operation of the Wide angle converter secondary optical system block 41 will be explained. When the lens front block 1 is located at a position shown in FIG. 8(a), a gear portion 1e of the lens front block 1 and the Wide angle converter gear 42 engage with each other, and the block 41 and the Wide angle converter gear 42 are connected by the Wide angle converter spring 43, thereby the converter secondary optical system block 41 is fixed to a Wide angle converter stopper (A) 44a under pressure while the Wide angle converter spring 43 is cocked.

When the lens front block 1 rotates in this state, the gear portion 1e of the lens front block 1 and the Wide angle converter gear 42 first engage with each other, and then the gear 42 rotates. Then, after finish of the engagement between the last tooth of the gear portion 1e of the lens front block 1 and the gear 42, the gear 42 can hold at the position, where the gear 42 has been rotated to stop, without reversely rotating by sliding the last gear of the gear 42 along a cam portion 1f of the lens front block 1. After the lens front block 1 rotates to a position shown in FIGS. 8(c) and 8(e), the one end of the Wide angle converter gear 42 is pressed by a press claw 1h of the lens front block 1 to cock the Wide angle converter spring 43, and then the Wide angle converter secondary optical system block 41 is fixed to the Wide angle converter stopper (B) 44b under pressure to retract outside a viewfinder optical path (Y denotes the center of the path).

Next, the operation of the wedge lens block 45 will be explained. When the lens rear block 2 is located at a position shown in FIGS. 8(b) and 8(d), the one end of the wedge gear 46 is pressed by a press claw 2h of the lens rear block 2 by the similar mechanism to that in the above-described state of the Wide angle converter secondary optical system block 41 as shown in FIGS. 8(c) and 8(e). Thereby, the wedge spring 47 is cocked to allow the wedge lens block 45 to be fixed to the wedge stopper (B) 48b under pressure to be retracted outside the viewfinder optical path. Then, the rotation of the lens rear block 2 causes the first tooth of the wedge gear 46 to slide along a cam portion 2f of the lens rear block 2. As a result of that, the first tooth of the gear portion 2e of the lens rear clock 2 starts to engage with the wedge gear 46, and in the state where the last tooth of the wedge gear 46 is engaging with the gear portion 2e of the lens rear block 2, the wedge lens block 45 is pressed against a wedge stopper (A) 48a while cocking the wedge spring 47 so as to insert the lens rear block 2 into the viewfinder optical path for positioning.

According to the embodiment, although the wedge lens is used for compensation of parallax in the Close-up lens state, another field frame instead of the wedge lens can be inserted into the viewfinder optical path to accomplish the same effects.

Since by only the lens change-over mechanism mentioned above, in each state of the Wide angle lens state, the Telephoto lens state, and the Close-up lens state, there is no gear connection between the lens change-over gears (A) 11 and (B) 13, the lens front block 1 and the lens rear block 2 are respectively held at their positions by press ability of the snap springs (A) 16 and (B) 17. Thus, it is possible to change over into another state by act of impact force on the camera. Then, in the embodiment, in order to prevent the photographing lens from changing over by outside force, change-over prevention claws (A) 18 and (B) 20 shown in FIG. 9 are arranged. Hereinafter, the operation of the change-over prevention claw (A) 18 will be explained as an example.

Figure 9E:
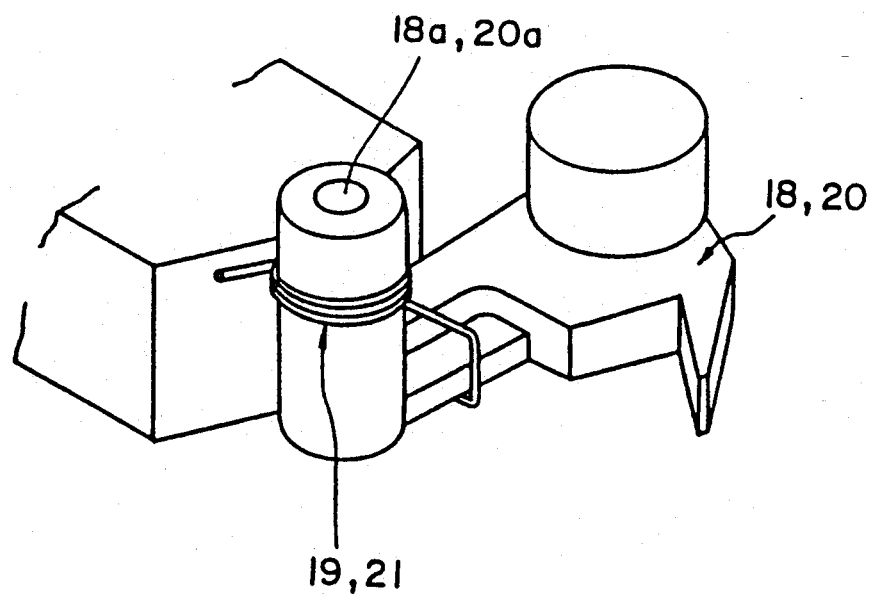
FIG. 9(e) is a perspective view showing a state where a change-over prevention spring is attached.
Figure 9A:
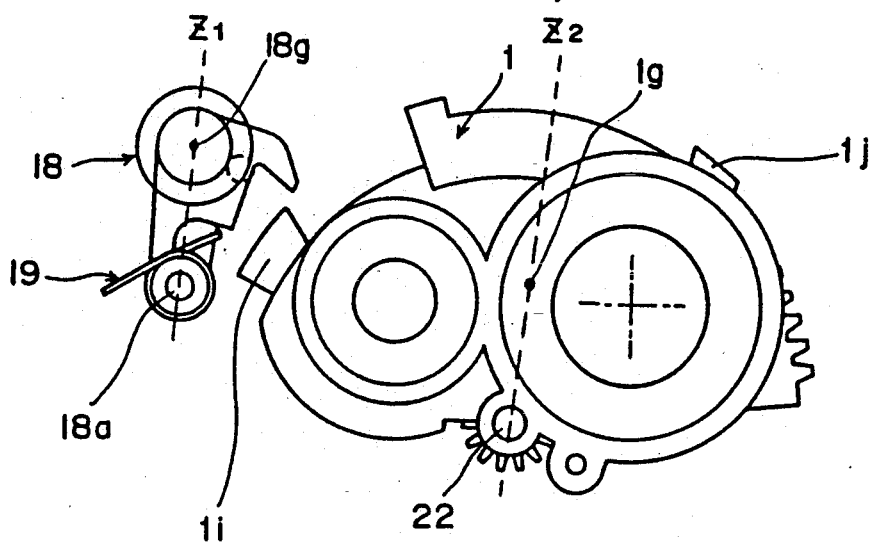
FIGS. 9(a), 9(b), 9(c) and 9(d) are explanatory views showing an operation of a change-over prevention mechanism.
Figure 9B:
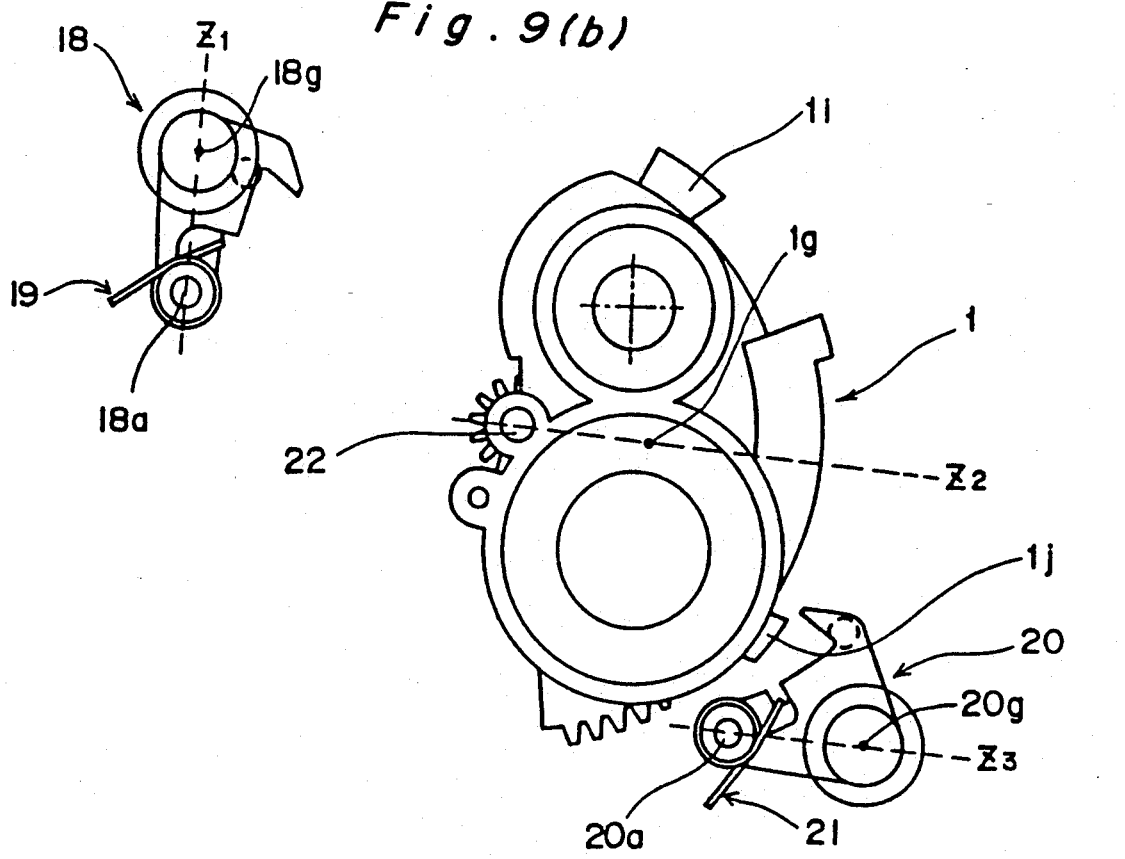
Figure 9C:
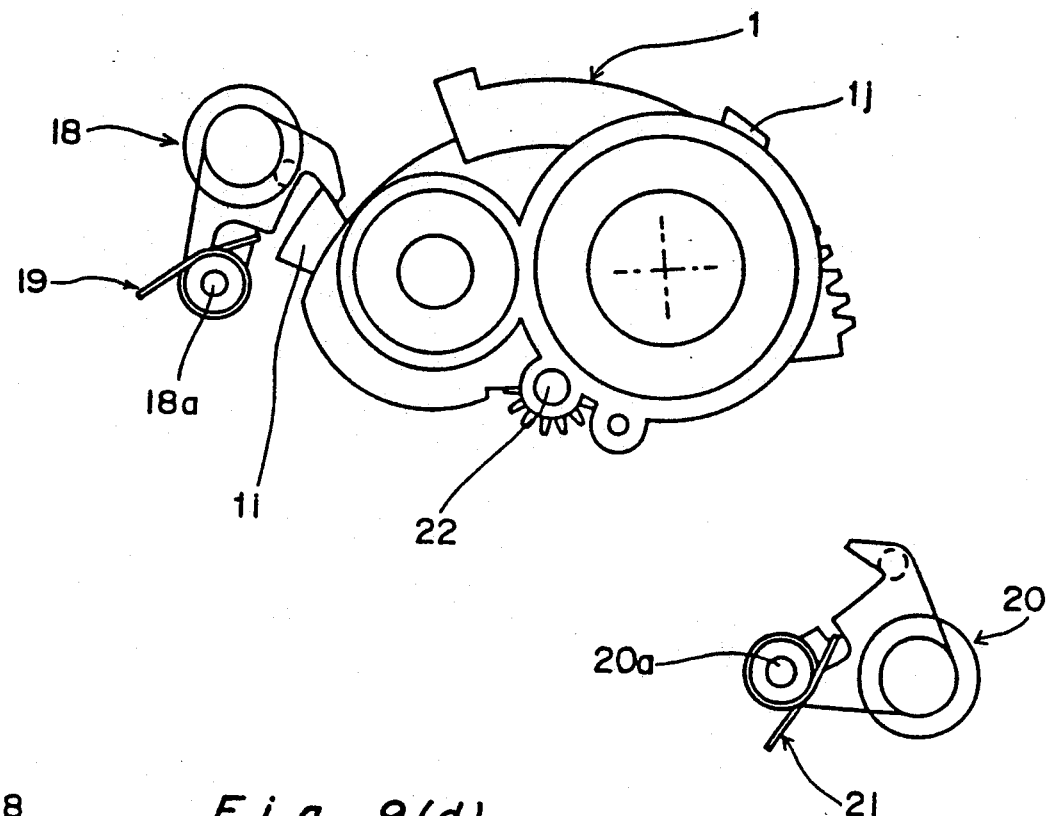

The change-over prevention claw (A) 18 is pivotably supported by a rotary shaft (A) 18a as shown in FIG. 9(e). In a normal state, by a change-over prevention spring (A) 19, the claw (A) 18 is held retracted at a position where the claw (A) 18 can not prevent the lens front block 1 and the lens rear block 2 from rotating as shown in FIGS. 9(A) and 9(b). For simplification of the drawings, the lens rear block 2 is not shown therein.

Now, it is assumed that inertia force is acted on the lens front block 1 and the lens rear block 2 on the basis of outside force for causing the blocks 1 and 2 to rotate in the normal directions in a case where at least one of the lens front block 1 and the lens rear block 2 is held at a position of 0 degree, that is, a state where the photographing lens is in the Wide angle lens state or the Telephoto lens state. Then, as shown in FIG. 9(a), it is assured by adjusting the weight balance that a straight line $Z_1$ passing through the center of gravity of the change-over prevention claw (A) 18 and the rotary shaft (A) 18a and a straight line $Z_2$ passing the center 1g of gravity of the lens front block 1 in the position of 0 degree of the block 1 and the lens rotary shaft 22 are arranged in generally parallel to each other. Therefore, the inertia force is also acted on the change-over prevention claw (A) 18 to cause it to rotate in the normal direction. The ratio of press ability of the change-over prevention claw (A) 18 by the change-over prevention spring (A) 19, that of the lens front block 1 by the snap spring (A) 16, and that of the lens rear block 2 by the snap spring (B) 17 is approximately equal to the ratio of the weight of the change-over prevention claw (A) 18, that of the lens front block 1, and that of the lens rear block 2 and thus when inertia force for causing the lens front block 1 and the lens rear block 2 to start to rotate is acted on the blocks 1 and 2, the change-over prevention claw (A) 18 rotates. Then, the change-over prevention claw (A) 18 enters the rotary loci of the lens front block 1 and the lens rear block 2 to engage with claws 1i and 2i (referred to FIG. 8(b)) arranged at both the lens blocks 1 and 2 for prevention of the rotation of both the lens blocks 1 and 2, referred to FIG. 9(c).

Generally the inertia force is momentarily acted thereon and then after the force is removed, the change-over prevention claw (A) 18, the lens front block 1, and the lens rear block 2 are respectively returned to their normal positions by the change-over prevention spring (A) 19, the snap springs (A) 16 and (B) 17, referred to FIG. 9(a).

Figure 9D:
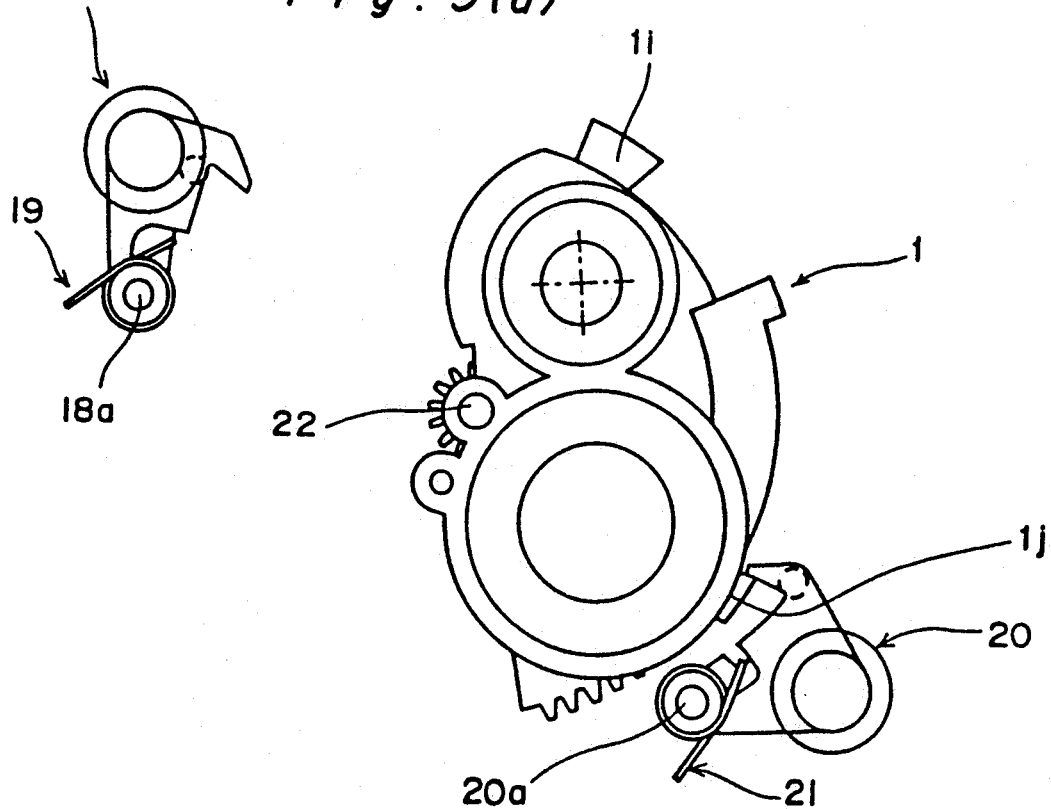

The change-over prevention claw (B) 20 shown in FIG. 9(e) also is operated similarly to the operation of the change-over prevention claw (A) 18 because the lens front block 1, the lens rear block 2, positions of the center of gravity and the rotary shaft, the ability of the spring are set to those of the change-over prevention claw (A) 18 (FIGS. 9(b) and 9(d)). In FIGS. 9(b) and 9(d), $Z_3$ denotes a straight line passing through the center of gravity of the change-over prevention claw (B) 20 and a rotary shaft 20a, and 1j and 2j (referring to FIG. 8(b)) denote claws with which the change-over prevention claw (B) 20 can engage.

Additionally, in the embodiment, when inertia force is acted thereon by outside force during the lens change-over operation and thus the lens front block 1 and the lens rear block 2 have been locked by the change-over prevention claws (A) 18 and (B) 20, it is possible that the motor 7 continues to rotate to break the motor and the gear train. For the prevention of the break, the reduction gear 8 partially has a sliding mechanism.

Figure 10A:
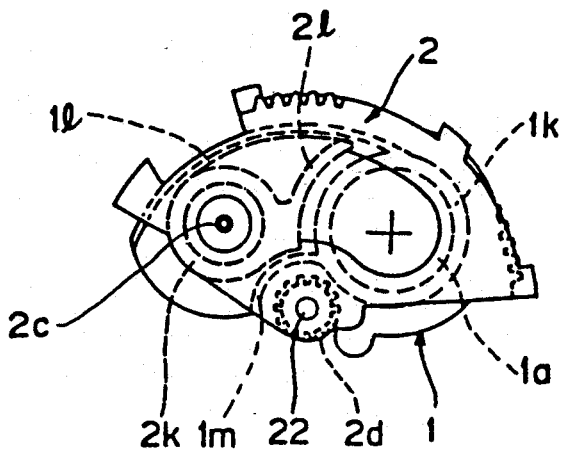
FIGS. 10(a), 10(b) and 10(c) are explanatory views of a stray light prevention mechanism.
Figure 10B:
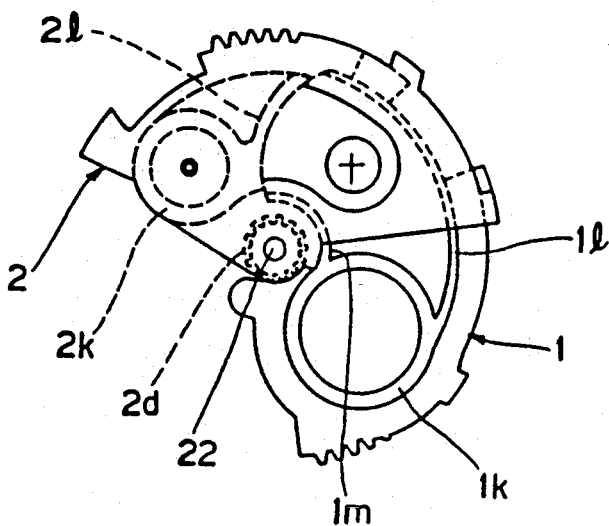
Figure 10C:
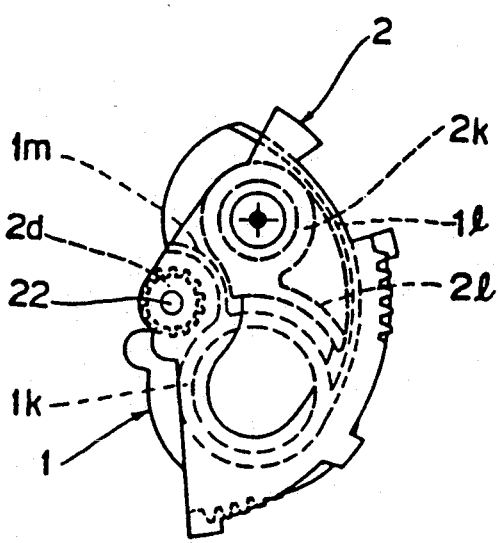

In the embodiment, the photographing lens system is divided into the lens front block 1 and the lens rear block 2 and thus it is possible that stray light invades in the photographing optical path by the independent operation of each block. Therefore, as shown in FIG. 10, stray light prevention walls protruding in circular arc are arranged at the lens front block 1 and the lens rear block 2 to shield the stray light. That is, the first annular stray light prevention wall 1k which surrounds the primary optical system 1a is formed at the surface $H_1$ (referring to FIG. 4(a)), confronting with the lens rear block 2, of the lens front block 1 to protrude from the lens front block 1 backward and forward. Two second stray light prevention walls 1l and 1m which extend to protrude from the first stray light prevention wall 1k around the rotary shaft of the lens rear block 2 in circular arc are formed to protrude therefrom backward and forward. A third annual stray light prevention wall 2k which surrounds the secondary optical system 2c is formed at the surface $H_2$ (referring to FIG. 4(a)), confronting with the lens front block 1, of the lens rear block 2 to protrude from the lens rear block 2 backward and forward. A fourth stray light prevention wall 21 which extends to protrude from the third stray light prevention wall 2k and which always closes a space between the two stray light prevention walls 1l and 1m is formed to protrude therefrom backward and forward. Since such walls are arranged at the blocks, even though the secondary optical system 2c are being retracted from the imaging surface side of the primary optical system 1a etc. by the rotation of the lens rear block 2, the fourth stray light prevention wall 21 closes the space between the second stray light prevention walls 1l and 1m, with the result that stray light effectively can be prevented from invading the camera. Therefore, in the Wide angle state (FIG. 10(a)), the Telephoto lens state (FIG. 10(b)), the Close-up lens state (FIG. 10(c)), and the change-over state which is in the course of changing over the lenses, stray light can be prevented from invading.

According to the embodiment, the lens barrier 58 is arranged on the object side of the photographing lens and the turning-on signal of the release switch 5 causes the lens barrier opening and closing driving means shown in FIG. 6 to be driven to open the lens barrier 58 to photograph. After the signal indicating the opening state of the lens barrier 58 is outputted from the lens barrier state-detecting means 52, the electric charge storage starts in the imaging device 25 on the basis of control of an imaging device control means which the device 25 contains. After termination of the charge storage, the charge termination signal is outputted from the control means to drive the driving means to close the lens barrier 58. Therefore, since the lens barrier 58 is opened only during a photographing period and closed during a non-photographing period, the lens barrier 58 covers the photographing lens and the device 25 to prevent the device 25 from being exposed to strong outside light even if the camera body does not have a diaphragm and a shutter blade. Then, it is effectively possible to prevent the outside light from burning the device 25. Since the lens barrier 58 covers the photographing lens during a non-photographing period, the lens can be protected as well as the device 25.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image apparatus, comprising:
   means for forming an image of an object;
   means for receiving the image formed by said image forming means to store electric charge corresponding to the image;
   means, located in front of said image forming means, for protecting said image forming means, said protecting means being changeable between a closed state in which said protecting means protects said image forming means and an opened state in which said protecting means is completely retracted from in front of said image forming means;
   means for driving said protecting means from said closed state to said opened state;
   means for detecting that said protecting means is driven to said opened state to produce a driving completion signal; and
   means for electrically starting the storing operation of said image receiving means in response to said completion signal.

2. An image apparatus as claimed in claim 1, further comprising, means for detecting that said image receiving means has completely stored electric charge corresponding to the image to produce a store completion signal, and means for driving said protecting means from said opened state to said closed state in response to said store completion signal.

3. An image apparatus as claimed in claim 2, further comprising, means for detecting quantity of light incident on said image receiving means, and means for controlling a charge storage time period of said image receiving means according to the quantity of light detected by said light quantity detecting means.

4. An image apparatus as claimed in claim 1, wherein said image forming means includes an objective lens.

5. An image apparatus as claimed in claim 1, wherein said protecting means includes a lens barrier.

6. An image apparatus, comprising:
   means for forming an image of an object;
   means for receiving the image formed by said image forming means to store electric charge corresponding to the image;
   means, located in front of said image forming means, for protecting said image forming means, said protecting means being changeable between a closed state in which said protecting means protects said image forming means and an opened state in which said protecting means is completely retracted from in front of said image forming means;
   means for driving said protecting means from said closed state to said opened state;
   means for detecting that said protecting means is driven to said opened state to produce a driving completion signal; and
   means for inhibiting a charge storage of said image receiving means until said driving completion signal is produced by said detecting means.

7. An image apparatus as claimed in claim 6, wherein said image forming means includes an objective lens.

8. An image apparatus as claimed in claim 6, wherein said protecting means includes a lens barrier.

9. A camera comprising:
   means for forming an image of an object;
   means for receiving the image formed by said image forming means to store electric charge corresponding to the image;
   means, located in front of said image forming means, for protecting said image forming means, said protecting means being changeable between a closed state in which said protecting means protects said image forming means and an opened state in which said protecting means is completely retracted from in front of said image forming means; and
   means for controlling both of a start and termination of charge storage of said image receiving means while said protecting means is in said opened state so as to control a charge storage time period of said image receiving means.

10. An image apparatus as claimed in claim 9, wherein said image forming means includes an objective lens.

11. An image apparatus as claimed in claim 9, wherein said protecting means includes a lens barrier.

* * * * *